United States Patent
Theur et al.

(10) Patent No.: US 9,524,170 B2
(45) Date of Patent: Dec. 20, 2016

(54) INSTRUCTION AND LOGIC FOR MEMORY DISAMBIGUATION IN AN OUT-OF-ORDER PROCESSOR

(71) Applicants: Rainer Theur, Sehnde (DE); Arun Raman, Santa Clara, CA (US); Jaroslaw Topp, Schoeppenstedt (DE); Rakesh Ranjan, Mountain View, CA (US); Sebastian Winkel, Los Altos, CA (US); Gregor Stellpflug, Braunschweig (DE); Ulrich Bretthauer, Braunschweig (DE)

(72) Inventors: Rainer Theur, Sehnde (DE); Arun Raman, Santa Clara, CA (US); Jaroslaw Topp, Schoeppenstedt (DE); Rakesh Ranjan, Mountain View, CA (US); Sebastian Winkel, Los Altos, CA (US); Gregor Stellpflug, Braunschweig (DE); Ulrich Bretthauer, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 387 days.

(21) Appl. No.: 14/139,171

(22) Filed: Dec. 23, 2013

(65) Prior Publication Data
US 2015/0178090 A1 Jun. 25, 2015

(51) Int. Cl.
*G06F 9/30* (2006.01)
*G06F 9/40* (2006.01)
*G06F 9/38* (2006.01)

(52) U.S. Cl.
CPC .................. *G06F 9/3855* (2013.01)

(58) Field of Classification Search
CPC ....................................... G06F 9/3855
USPC ......................................... 712/217
See application file for complete search history.

(56) References Cited

U.S. PATENT DOCUMENTS

| 7,509,482 B2* | 3/2009 | Takahashi | G06F 9/3802 712/214 |
| 2004/0054875 A1* | 3/2004 | Segelken | G06F 9/30014 712/214 |
| 2012/0124337 A1* | 5/2012 | Hardage | G06F 9/30112 712/208 |

* cited by examiner

*Primary Examiner* — Chun-Kuan Lee
(74) *Attorney, Agent, or Firm* — Baker Botts L.L.P.

(57) ABSTRACT

A system includes a processor with a front end to receive an instruction stream reordered by a software scheduler and including a plurality of memory operations and alias information indicating how a given memory operation may be evaluated. Furthermore, the processor includes a hardware scheduler to reorder, in hardware, the instruction stream for out-of-order execution. In addition, the processor includes a calculation module to determine, for a given memory operation and based upon the alias information, a checking range of memory atoms subsequent to the given memory operation and a virtual order of the memory operation. The virtual order indicates an original ordering of the instructions. The processor also includes an alias unit to reorder the instruction stream, determine whether the hardware reordering caused an error, and determine whether the software reordering caused an error based upon the checking range and the virtual order.

20 Claims, 31 Drawing Sheets

| 127 | 112 111 | 96 95 | 80 79 | 64 63 | 48 47 | 32 31 | 16 15 | 0 |
|---|---|---|---|---|---|---|---|---|
| HALF 7 | HALF 6 | HALF 5 | HALF 4 | HALF 3 | HALF 2 | HALF 1 | HALF 0 | |

PACKED HALF
341

| 127 | 96 95 | 64 63 | 32 31 | 0 |
|---|---|---|---|---|
| SINGLE 3 | SINGLE 2 | SINGLE 1 | SINGLE 0 | |

PACKED SINGLE
342

| 127 | 64 63 | 0 |
|---|---|---|
| DOUBLE 1 | DOUBLE 0 | |

PACKED DOUBLE
343

FIG. 3B

```
127     120 119   112 111   104 103              24 23     16 15      8 7        0
| bbbb bbbb | bbbb bbbb | bbbb bbbb |  •  •  •  | bbbb bbbb | bbbb bbbb | bbbb bbbb |
```

UNSIGNED PACKED BYTE REPRESENTATION 344

```
127     120 119   112 111   104 103              24 23     16 15      8 7        0
| sbbb bbbb | sbbb bbbb | sbbb bbbb |  •  •  •  | sbbb bbbb | sbbb bbbb | sbbb bbbb |
```

SIGNED PACKED BYTE REPRESENTATION 345

```
127              112 111                                 16 15              0
| wwww wwww wwww wwww |         •  •  •           | wwww wwww wwww wwww |
```

UNSIGNED PACKED WORD REPRESENTATION 346

```
127              112 111                                 16 15              0
| swww wwww wwww wwww |         •  •  •           | swww wwww wwww wwww |
```

SIGNED PACKED WORD REPRESENTATION 347

```
127                              92 91   32 31                              0
| dddd dddd dddd dddd dddd dddd dddd dddd | • • • | dddd dddd dddd dddd dddd dddd dddd dddd |
```

UNSIGNED PACKED DOUBLEWORD REPRESENTATION 348

```
127                              92 91   32 31                              0
| sddd dddd dddd dddd dddd dddd dddd dddd | • • • | sddd dddd dddd dddd dddd dddd dddd dddd |
```

SIGNED PACKED DOUBLEWORD REPRESENTATION 349

FIG. 3C

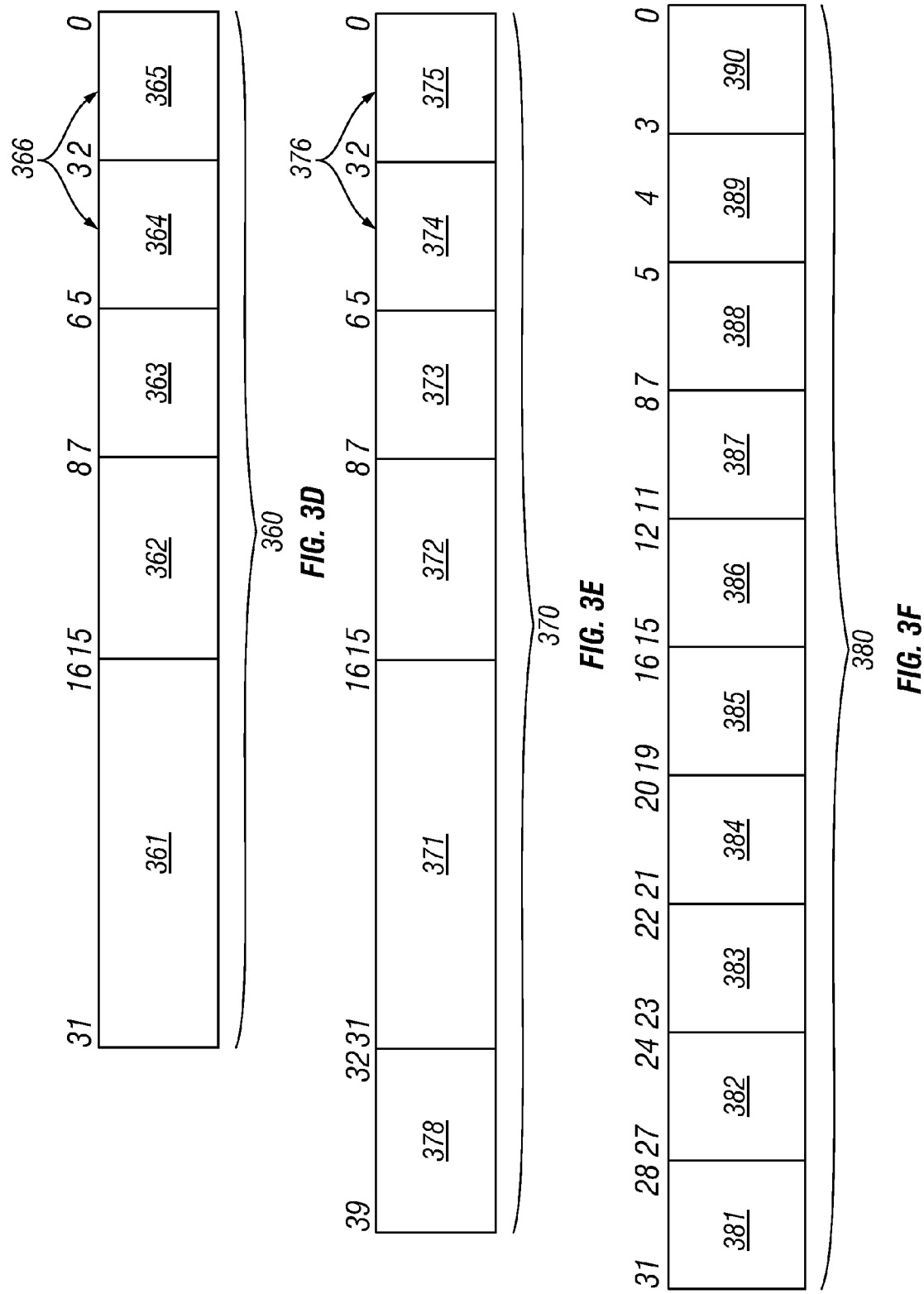

INSTRUCTION AND LOGIC FOR MEMORY DISAMBIGUATION IN AN OUT-OF-ORDER PROCESSOR

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. Applications of multiprocessor systems include dynamic domain partitioning all the way down to desktop computing. In order to take advantage of multiprocessor systems, code to be executed may be separated into multiple threads for execution by various processing entities. Each thread may be executed in parallel with one another. Furthermore, in order to increase the utility of a processing entity, out-of-order execution may be employed. Out-of-order execution may execute instructions as input to such instructions is made available. Thus, an instruction that appears later in a code sequence may be executed before an instruction appearing earlier in a code sequence.

DESCRIPTION OF THE FIGURES

Embodiments are illustrated by way of example and not limitation in the Figures of the accompanying drawings:

FIG. 3B illustrates possible in-register data storage formats, in accordance with embodiments of the present disclosure;

FIG. 3C illustrates various signed and unsigned packed data type representations in multimedia registers, in accordance with embodiments of the present disclosure;

FIG. 3D illustrates an embodiment of an operation encoding format;

FIG. 3E illustrates another possible operation encoding format having forty or more bits, in accordance with embodiments of the present disclosure;

FIG. 3F illustrates yet another possible operation encoding format, in accordance with embodiments of the present disclosure;

DETAILED DESCRIPTION

Figure 1A:
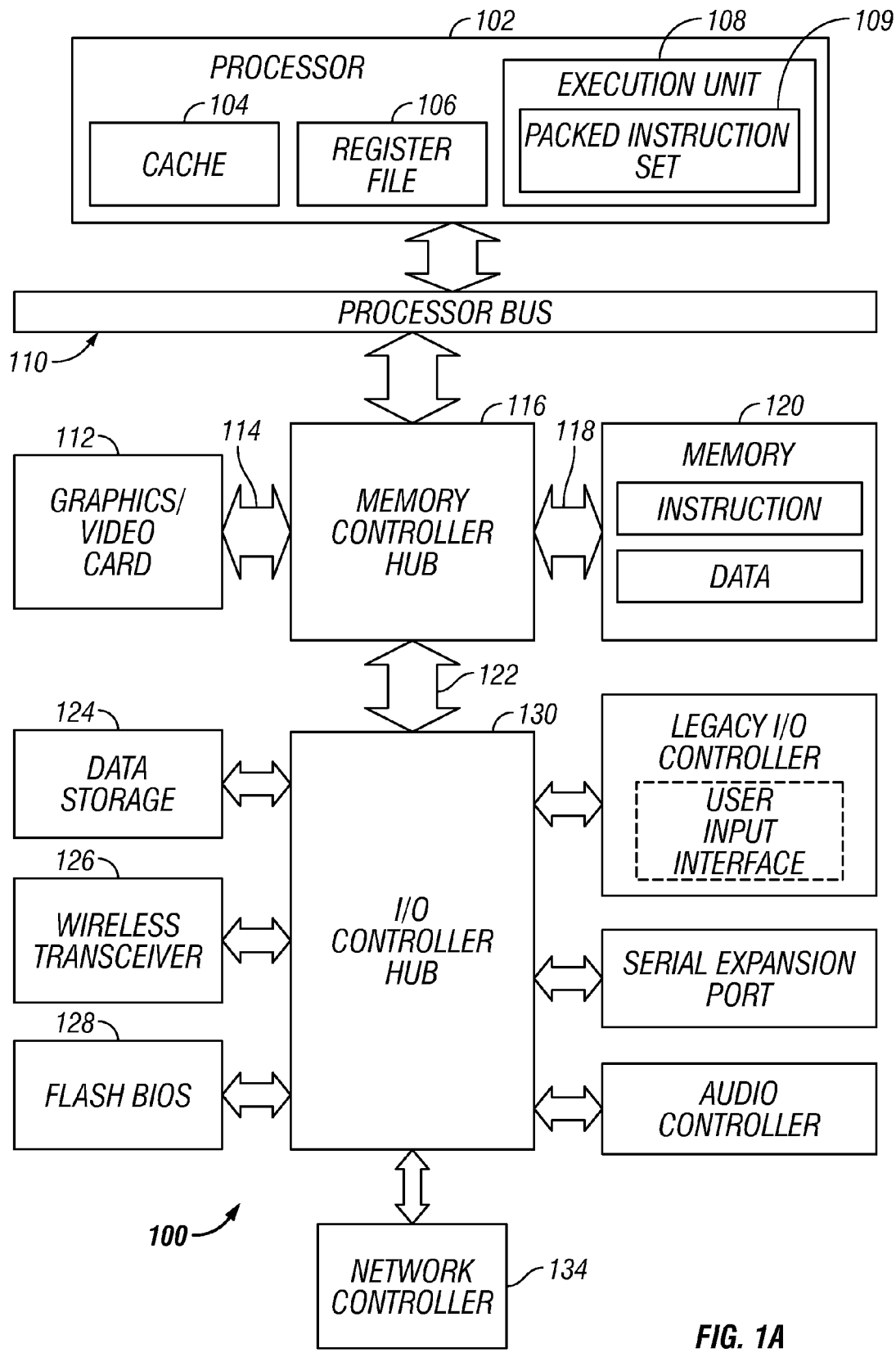
FIG. 1A is a block diagram of an exemplary computer system formed with a processor that may include execution units to execute an instruction, in accordance with embodiments of the present disclosure.

The following description describes an instruction and processing logic for memory disambiguation in association with a processor, virtual processor, package, computer system, or other processing apparatus. Such a processing apparatus may include an out-of-order processor. Furthermore, such a memory disambiguation may be performed without use of a memory order buffer. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOW™ operating system available from Microsoft Corporation of Redmond, Wash. although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions and/or data represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for instruction and data storage and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
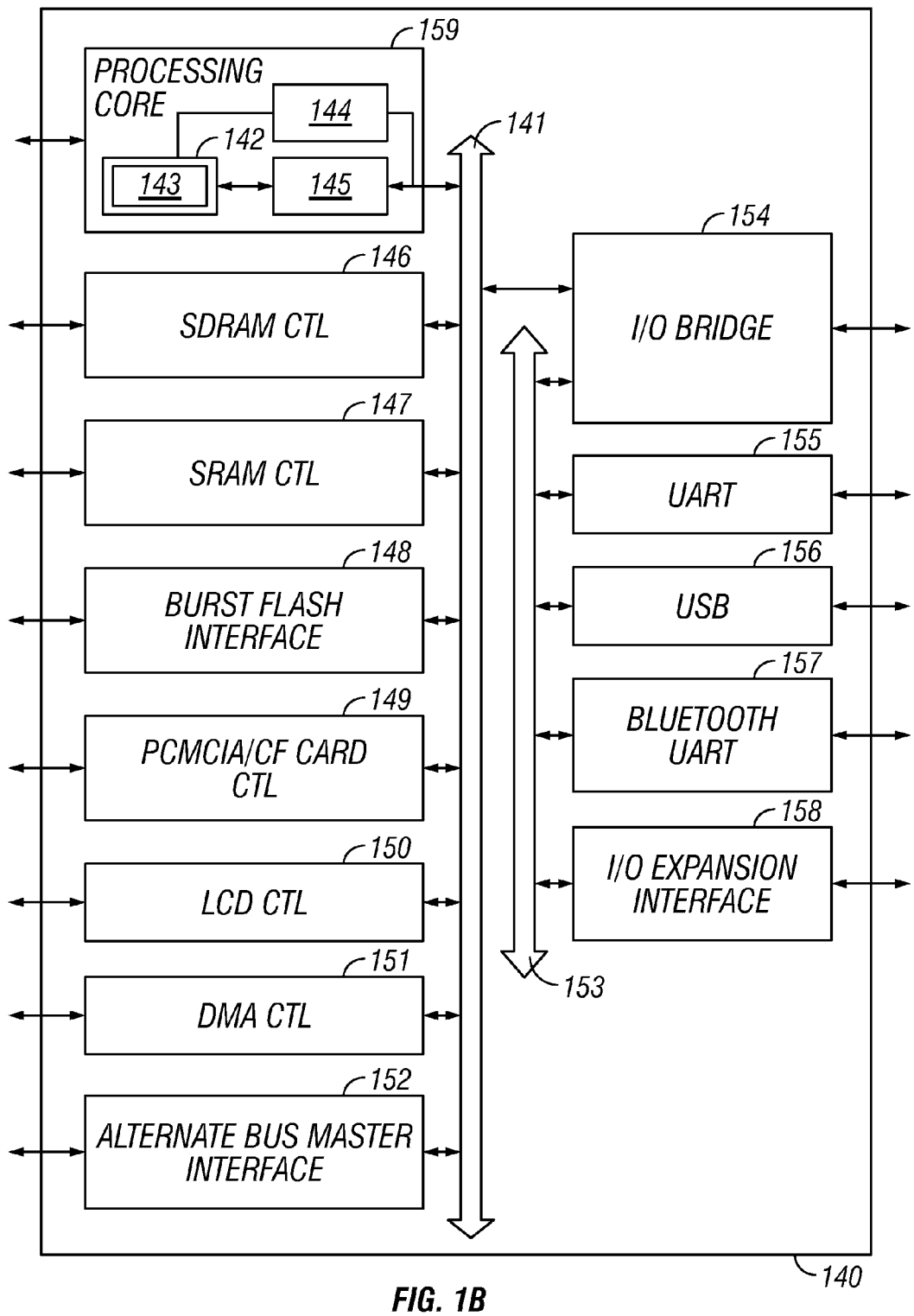
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
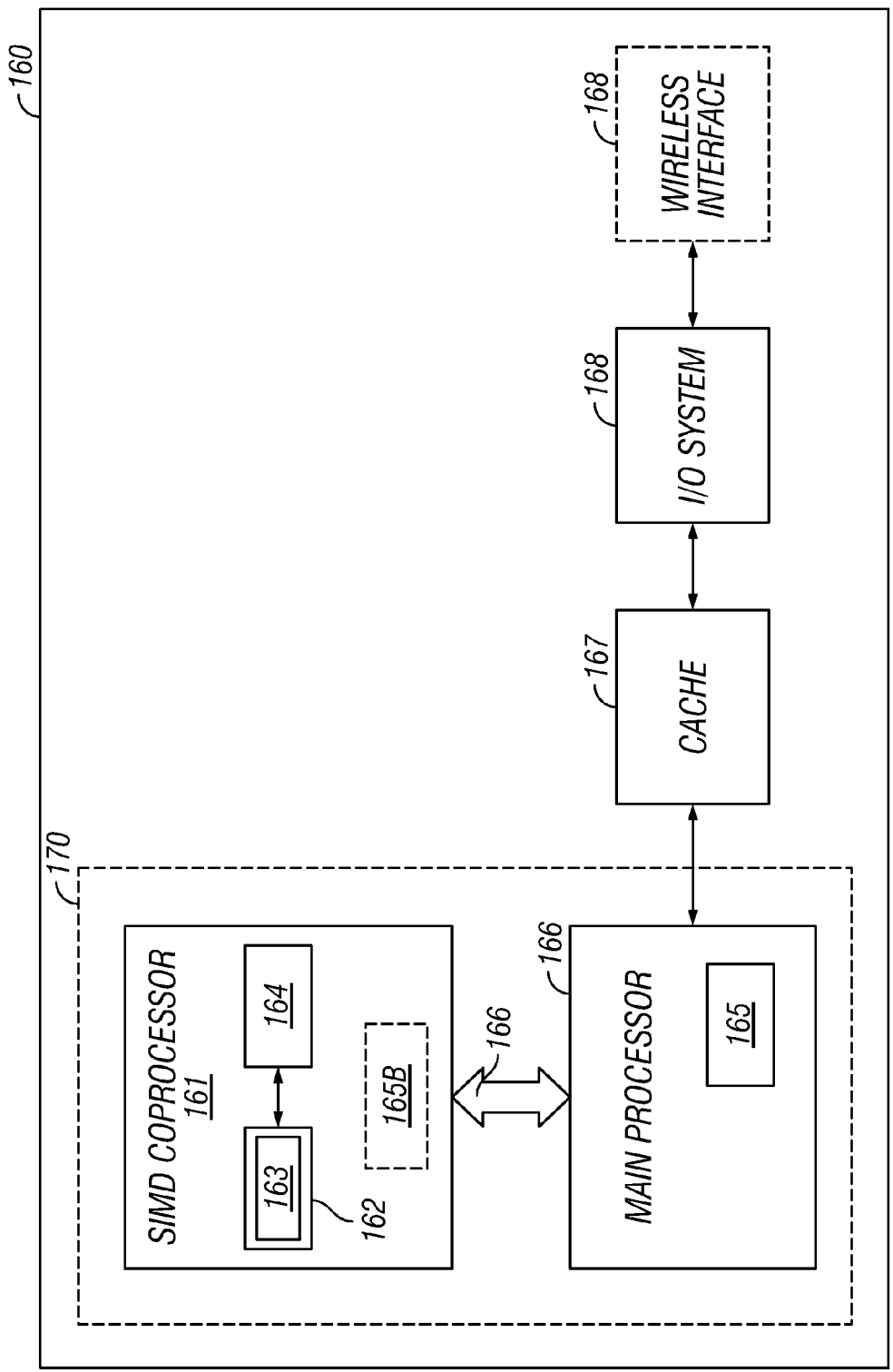
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 165 comprises a decoder 165 to recognize instructions of instruction set 163 including instructions in accordance with one embodiment for execution by execution unit 162. In other embodiments, SIMD coprocessor 161 also comprises at least part of decoder 165 to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 166. From coprocessor bus 166, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
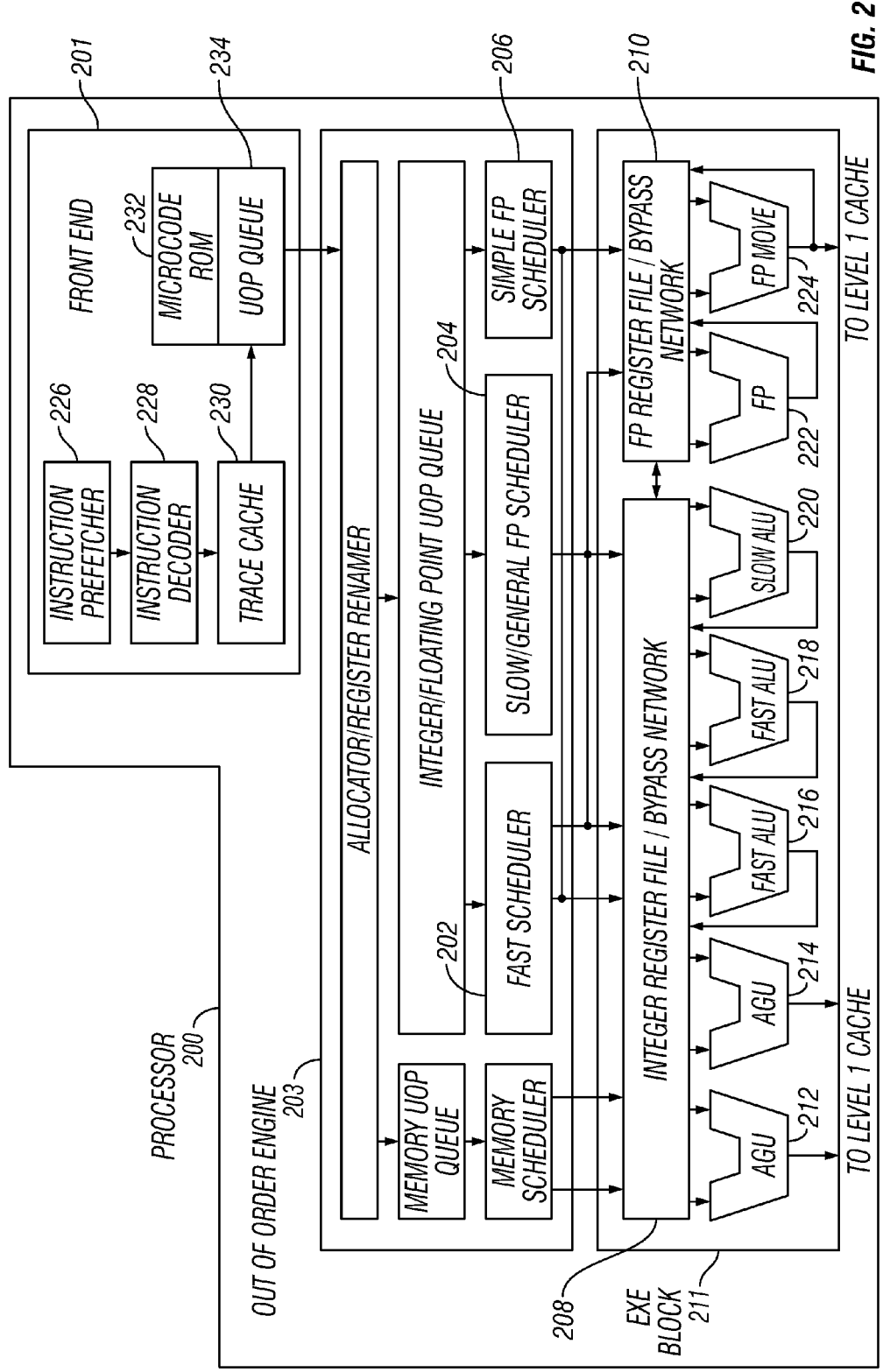
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast ALU 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point may be contained in the same register file or different register files. Furthermore, in one embodiment, floating point and integer data may be stored in different registers or the same registers.

Figure 3A:
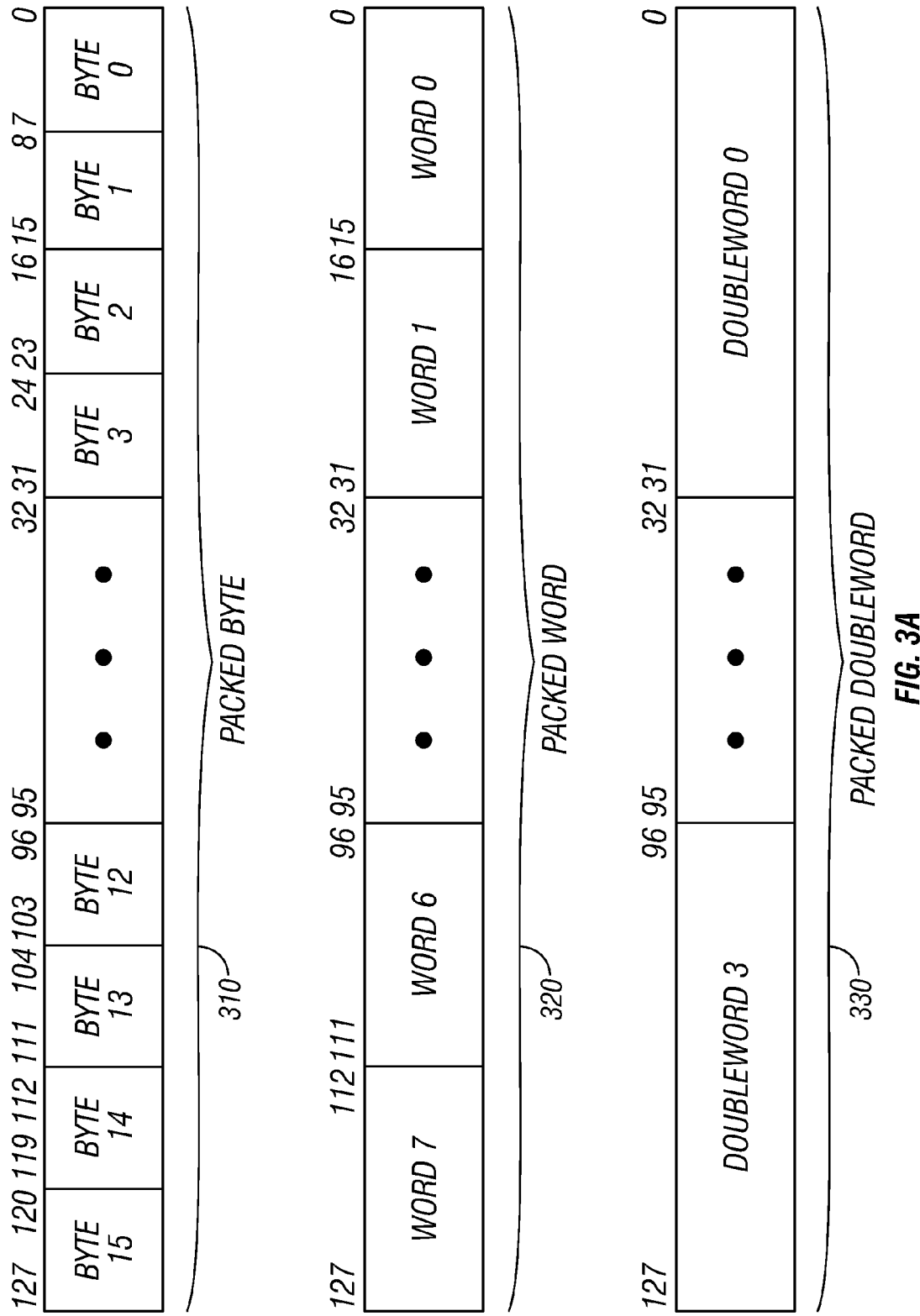
FIG. 3A illustrates various packed data type representations in multimedia registers, in accordance with embodiments of the present disclosure.

In the examples of the following figures, a number of data operands may be described. FIG. 3A illustrates various packed data type representations in multimedia registers, in accordance with embodiments of the present disclosure. FIG. 3A illustrates data types for a packed byte 310, a packed word 320, and a packed doubleword (dword) 330 for 128-bit wide operands. Packed byte format 310 of this example may be 128 bits long and contains sixteen packed byte data elements. A byte may be defined, for example, as eight bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement increases the storage efficiency of the processor. As well, with sixteen data elements accessed, one operation may now be performed on sixteen data elements in parallel.

Generally, a data element may include an individual piece of data that is stored in a single register or memory location with other data elements of the same length. In packed data sequences relating to SSEx technology, the number of data elements stored in a XMM register may be 128 bits divided by the length in bits of an individual data element. Similarly, in packed data sequences relating to MMX and SSE technology, the number of data elements stored in an MMX register may be 64 bits divided by the length in bits of an individual data element. Although the data types illustrated in FIG. 3A may be 128 bits long, embodiments of the present disclosure may also operate with 64-bit wide or other sized operands. Packed word format 320 of this example may be 128 bits long and contains eight packed word data elements. Each packed word contains sixteen bits of information. Packed doubleword format 330 of FIG. 3A may be 128 bits long and contains four packed doubleword data elements. Each packed doubleword data element contains thirty-two bits of information. A packed quadword may be 128 bits long and contain two packed quad-word data elements.

FIG. 3B illustrates possible in-register data storage formats, in accordance with embodiments of the present disclosure. Each packed data may include more than one independent data element. Three packed data formats are illustrated; packed half 341, packed single 342, and packed double 343. One embodiment of packed half 341, packed single 342, and packed double 343 contain fixed-point data elements. For another embodiment one or more of packed half 341, packed single 342, and packed double 343 may contain floating-point data elements. One embodiment of packed half 341 may be 128 bits long containing eight 16-bit data elements. One embodiment of packed single 342 may be 128 bits long and contains four 32-bit data elements. One embodiment of packed double 343 may be 128 bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers, in accordance with embodiments of the present disclosure. Unsigned packed byte representation 344 illustrates the storage of an unsigned packed byte in a SIMD register. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase the storage efficiency of the processor. As well, with sixteen data elements accessed, one operation may now be performed on sixteen data elements in a parallel fashion. Signed packed byte representation 345 illustrates the storage of a signed packed byte. Note that the eighth bit of every byte data element may be the sign indicator. Unsigned packed word representation 346 illustrates how word seven through word zero may be stored in a SIMD register. Signed packed word representation 347 may be similar to the unsigned packed word in-register representation 346. Note that the sixteenth bit of each word data element may be the sign indicator. Unsigned packed doubleword representation 348 shows how doubleword data elements are stored. Signed packed doubleword representation 349 may be similar to unsigned packed doubleword in-register representation 348. Note that the necessary sign bit may be the thirty-second bit of each doubleword data element.

FIG. 3D illustrates an embodiment of an operation encoding (opcode). Furthermore, format 360 may include register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel.com/design/litcentr. In one embodiment, and instruction may be encoded by one or more of fields 361 and 362. Up to two operand locations per instruction may be identified, including up to two source operand identifiers 364 and 365. In one embodiment, destination operand identifier 366 may be the same as source operand identifier 364, whereas in other embodiments they may be different. In another embodiment, destination operand identifier 366 may be the same as source operand identifier 365, whereas in other embodiments they may be different. In one embodiment, one of the source operands identified by source operand identifiers 364 and 365 may be overwritten by the results of the text string comparison operations, whereas in other embodiments identifier 364 corresponds to a source register element and identifier 365 corresponds to a destination register element. In one embodiment, operand identifiers 364 and 365 may identify 32-bit or 64-bit source and destination operands.

FIG. 3E illustrates another possible operation encoding (opcode) format 370, having forty or more bits, in accordance with embodiments of the present disclosure. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. In one embodiment, prefix byte 378 may be used to identify 32-bit or 64-bit source and destination operands. In one embodiment, destination operand identifier 376 may be the same as source operand identifier 374, whereas in other embodiments they may be different. For another embodiment, destination operand identifier 376 may be the same as source operand identifier 375, whereas in other embodiments they may be different. In one embodiment, an instruction operates on one or more of the operands identified by operand identifiers 374 and 375 and one or more operands identified by operand identifiers 374 and 375 may be overwritten by the results of the instruction, whereas in other embodiments, operands identified by identifiers 374 and 375 may be written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

FIG. 3F illustrates yet another possible operation encoding (opcode) format, in accordance with embodiments of the present disclosure. 64-bit single instruction multiple data (SIMD) arithmetic operations may be performed through a coprocessor data processing (CDP) instruction. Operation encoding (opcode) format 380 depicts one such CDP instruction having CDP opcode fields 382 an0064 389. The type of CDP instruction, for another embodiment, operations may be encoded by one or more of fields 383, 384, 387, and 388. Up to three operand locations per instruction may be identified, including up to two source operand identifiers 385 and 390 and one destination operand identifier 386. One embodiment of the coprocessor may operate on eight, sixteen, thirty-two, and 64-bit values. In one embodiment, an instruction may be performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection may be done on SIMD fields. For some instructions, the type of saturation may be encoded by field 384.

Figure 4A:
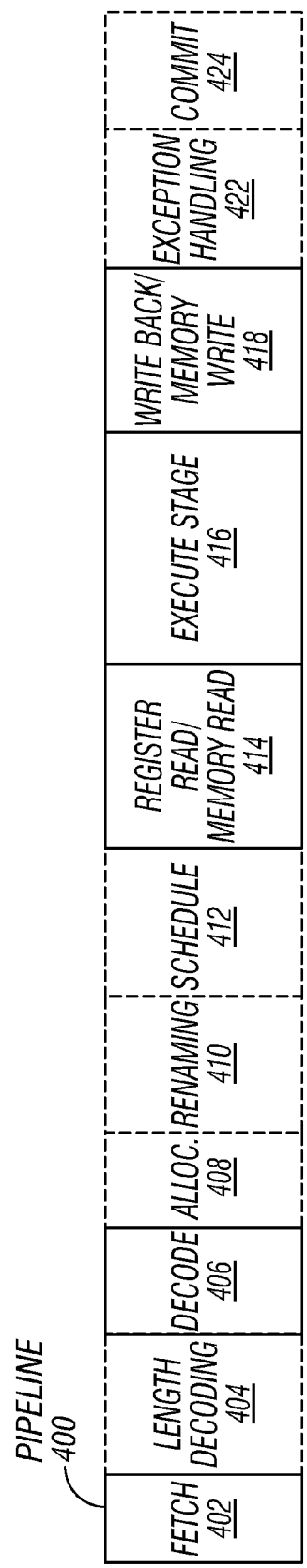
FIG. 4A is a block diagram illustrating an in-order pipeline and a register renaming stage, out-of-order issue/execution pipeline, in accordance with embodiments of the present disclosure.
Figure 4B:
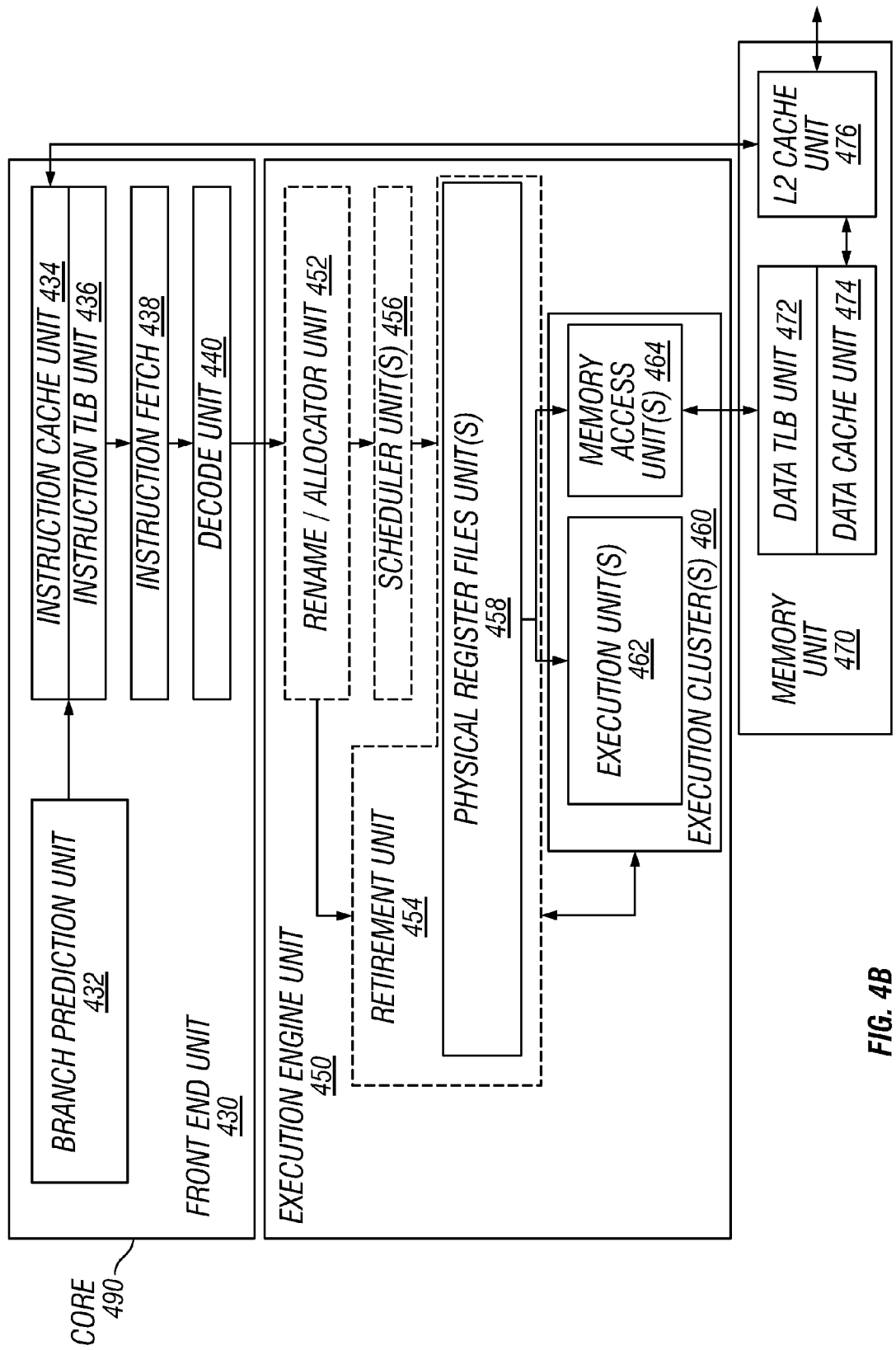
FIG. 4B is a block diagram illustrating an in-order architecture core and a register renaming logic, out-of-order issue/execution logic to be included in a processor, in accordance with embodiments of the present disclosure.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and a register renaming logic, out-of-order issue/execution logic to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a writeback/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 154 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 162 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif. the ARM instruction set (with optional additional extensions such as NEON) of ARM Holdings of Sunnyvale, Calif.).

It should be understood that the core may support multithreading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the cache may be external to the core and/or the processor.

Figure 5A:
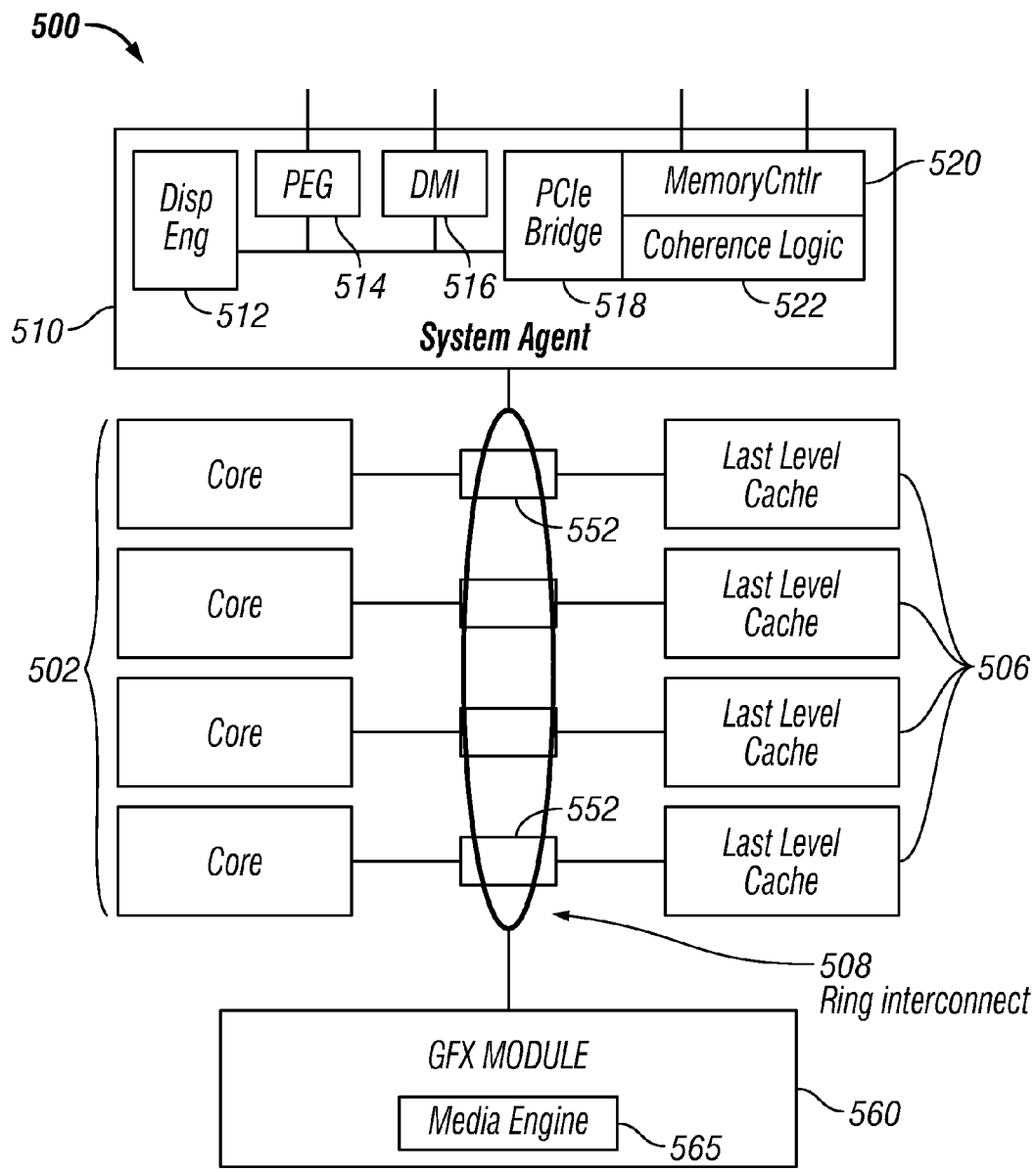
FIG. 5A is a block diagram of a processor, in accordance with embodiments of the present disclosure.

FIG. 5A is a block diagram of a processor 500, in accordance with embodiments of the present disclosure. In one embodiment, processor 500 may include a multicore processor. Processor 500 may include a system agent 510 communicatively coupled to one or more cores 502. Furthermore, cores 502 and system agent 510 may be communicatively coupled to one or more caches 506. Cores 502, system agent 510, and caches 506 may be communicatively coupled via one or more memory control units 552. Furthermore, cores 502, system agent 510, and caches 506 may be communicatively coupled to a graphics module 560 via memory control units 552.

Processor 500 may include any suitable mechanism for interconnecting cores 502, system agent 510, and caches 506, and graphics module 560. In one embodiment, processor 500 may include a ring-based interconnect unit 508 to interconnect cores 502, system agent 510, and caches 506, and graphics module 560. In other embodiments, processor 500 may include any number of well-known techniques for interconnecting such units. Ring-based interconnect unit 508 may utilize memory control units 552 to facilitate interconnections.

Processor 500 may include a memory hierarchy comprising one or more levels of caches within the cores, one or more shared cache units such as caches 506, or external memory (not shown) coupled to the set of integrated memory controller units 552. Caches 506 may include any suitable cache. In one embodiment, caches 506 may include one or more mid-level caches, such as level 2 (L2), level 3 (L3), level 4 (L4), or other levels of cache, a last level cache (LLC), and/or combinations thereof.

In various embodiments, one or more of cores 502 may perform multithreading. System agent 510 may include components for coordinating and operating cores 502. System agent unit 510 may include for example a power control unit (PCU). The PCU may be or include logic and components needed for regulating the power state of cores 502. System agent 510 may include a display engine 512 for driving one or more externally connected displays or graphics module 560. System agent 510 may include an interface 1214 for communications busses for graphics. In one embodiment, interface 1214 may be implemented by PCI Express (PCIe). In a further embodiment, interface 1214 may be implemented by PCI Express Graphics (PEG). System agent 510 may include a direct media interface (DMI) 516. DMI 516 may provide links between different bridges on a motherboard or other portion of a computer system. System agent 510 may include a PCIe bridge 1218 for providing PCIe links to other elements of a computing system. PCIe bridge 1218 may be implemented using a memory controller 1220 and coherence logic 1222.

Cores 502 may be implemented in any suitable manner. Cores 502 may be homogenous or heterogeneous in terms of architecture and/or instruction set. In one embodiment, some of cores 502 may be in-order while others may be out-of-order. In another embodiment, two or more of cores 502 may execute the same instruction set, while others may execute only a subset of that instruction set or a different instruction set.

Processor 500 may include a general-purpose processor, such as a Core™ i3, i5, i7, 2 Duo and Quad, Xeon™, Itanium,™, XScale™ or StrongARM™ processor, which may be available from Intel Corporation, of Santa Clara, Calif. Processor 500 may be provided from another company, such as ARM Holdings, Ltd, MIPS, etc. Processor 500 may be a special-purpose processor, such as, for example, a network or communication processor, compression engine, graphics processor, co-processor, embedded processor, or the like. Processor 500 may be implemented on one or more chips. Processor 500 may be a part of and/or may be implemented on one or more substrates using any of a number of process technologies, such as, for example, BiCMOS, CMOS, or NMOS.

In one embodiment, a given one of caches 506 may be shared by multiple ones of cores 502. In another embodiment, a given one of caches 506 may be dedicated to one of cores 502. The assignment of caches 506 to cores 502 may be handled by a cache controller or other suitable mechanism. A given one of caches 506 may be shared by two or more cores 502 by implementing time-slices of a given cache 506.

Graphics module 560 may implement an integrated graphics processing subsystem. In one embodiment, graphics module 560 may include a graphics processor. Furthermore, graphics module 560 may include a media engine 565. Media engine 565 may provide media encoding and video decoding.

Figure 5B:
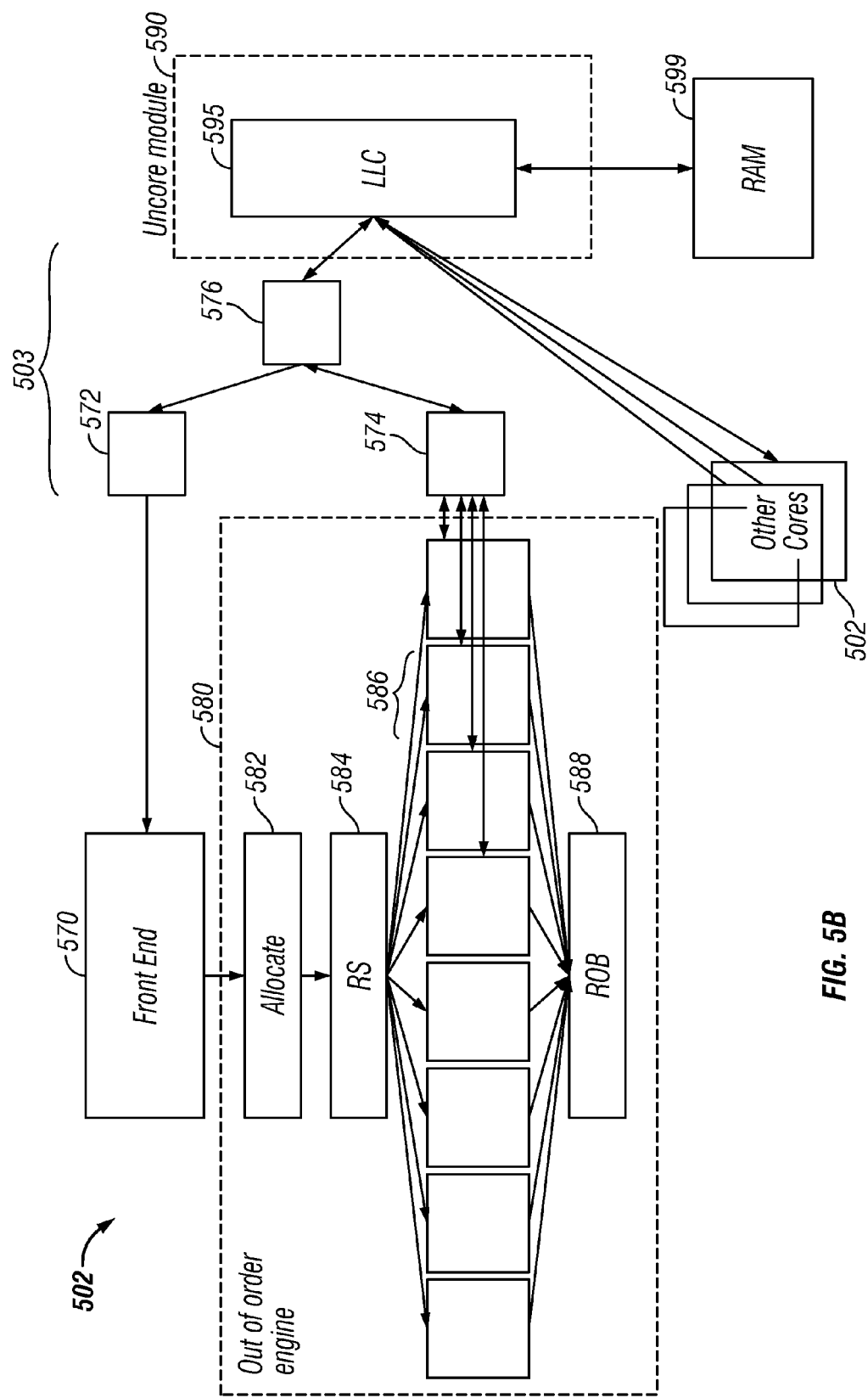
FIG. 5B is a block diagram of an example implementation of a core, in accordance with embodiments of the present disclosure.

FIG. 5B is a block diagram of an example implementation of a core 502, in accordance with embodiments of the present disclosure. Core 502 may include a front end 570 communicatively coupled to an out-of-order engine 580. Core 502 may be communicatively coupled to other portions of processor 500 through cache hierarchy 503.

Front end 570 may be implemented in any suitable manner, such as fully or in part by front end 201 as described above. In one embodiment, front end 570 may communicate with other portions of processor 500 through cache hierarchy 503. In a further embodiment, front end 570 may fetch instructions from portions of processor 500 and prepare the instructions to be used later in the processor pipeline as they are passed to out-of-order execution engine 580.

Out-of-order execution engine 580 may be implemented in any suitable manner, such as fully or in part by out-of-order execution engine 203 as described above. Out-of-order execution engine 580 may prepare instructions received from front end 570 for execution. Out-of-order execution engine 580 may include an allocate module 1282. In one embodiment, allocate module 1282 may allocate resources of processor 500 or other resources, such as registers or buffers, to execute a given instruction. Allocate module 1282 may make allocations in schedulers, such as a memory scheduler, fast scheduler, or floating point scheduler. Such schedulers may be represented in FIG. 5B by resource schedulers 584. Allocate module 1282 may be implemented fully or in part by the allocation logic described in conjunction with FIG. 2. Resource schedulers 584 may determine when an instruction is ready to execute based on the readiness of a given resource's sources and the availability of execution resources needed to execute an instruction. Resource schedulers 584 may be implemented by, for example, schedulers 202, 204, 206 as discussed above. Resource schedulers 584 may schedule the execution of instructions upon one or more resources. In one embodiment, such resources may be internal to core 502, and may be illustrated, for example, as resources 586. In another embodiment, such resources may be external to core 502 and may be accessible by, for example, cache hierarchy 503. Resources may include, for example, memory, caches, register files, or registers. Resources internal to core 502 may be represented by resources 586 in FIG. 5B. As necessary, values written to or read from resources 586 may be coordinated with other portions of processor 500 through, for example, cache hierarchy 503. As instructions are assigned resources, they may be placed into a reorder buffer 588. Reorder buffer 588 may track instructions as they are executed and may selectively reorder their execution based upon any suitable criteria of processor 500. In one embodiment, reorder buffer 588 may identify instructions or a series of instructions that may be executed independently. Such instructions or a series of instructions may be executed in parallel from other such instructions. Parallel execution in core 502 may be performed by any suitable number of separate execution blocks or virtual processors. In one embodiment, shared resources—such as memory, registers, and caches—may be accessible to multiple virtual processors within a given core 502. In other embodiments, shared resources may be accessible to multiple processing entities within processor 500.

Cache hierarchy 503 may be implemented in any suitable manner. For example, cache hierarchy 503 may include one or more lower or mid-level caches, such as caches 572, 574. In one embodiment, cache hierarchy 503 may include an LLC 595 communicatively coupled to caches 572, 574. In another embodiment, LLC 595 may be implemented in a module 590 accessible to all processing entities of processor 500. In a further embodiment, module 590 may be implemented in an uncore module of processors from Intel, Inc. Module 590 may include portions or subsystems of processor 500 necessary for the execution of core 502 but might not be implemented within core 502. Besides LLC 595, Module 590 may include, for example, hardware interfaces, memory coherency coordinators, interprocessor interconnects, instruction pipelines, or memory controllers. Access to RAM 599 available to processor 500 may be made through module 590 and, more specifically, LLC 595. Furthermore, other instances of core 502 may similarly access module 590. Coordination of the instances of core 502 may be facilitated in part through module 590.

Figure 6:
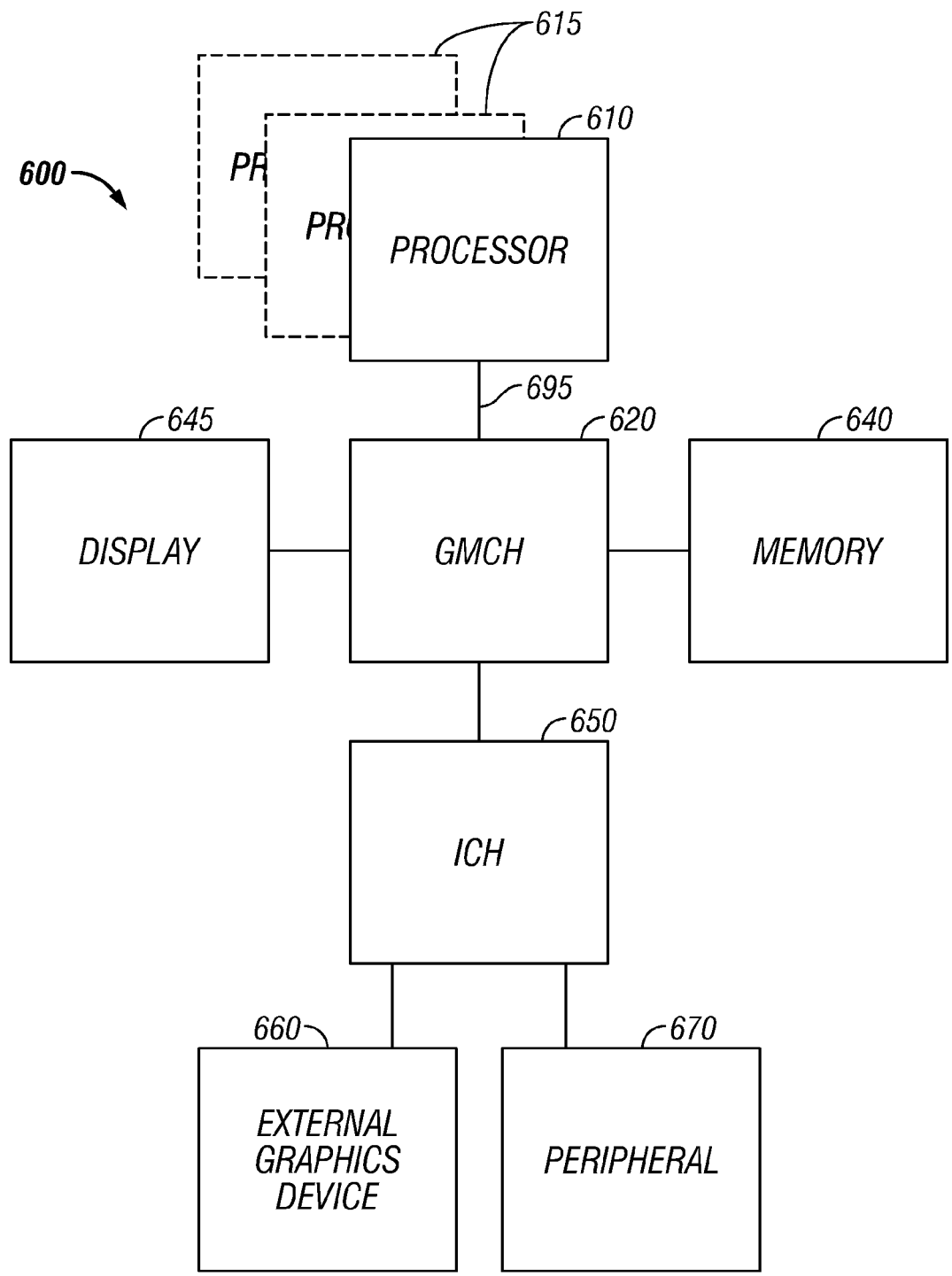
FIG. 6 is a block diagram of a system, in accordance with embodiments of the present disclosure.
Figure 7:
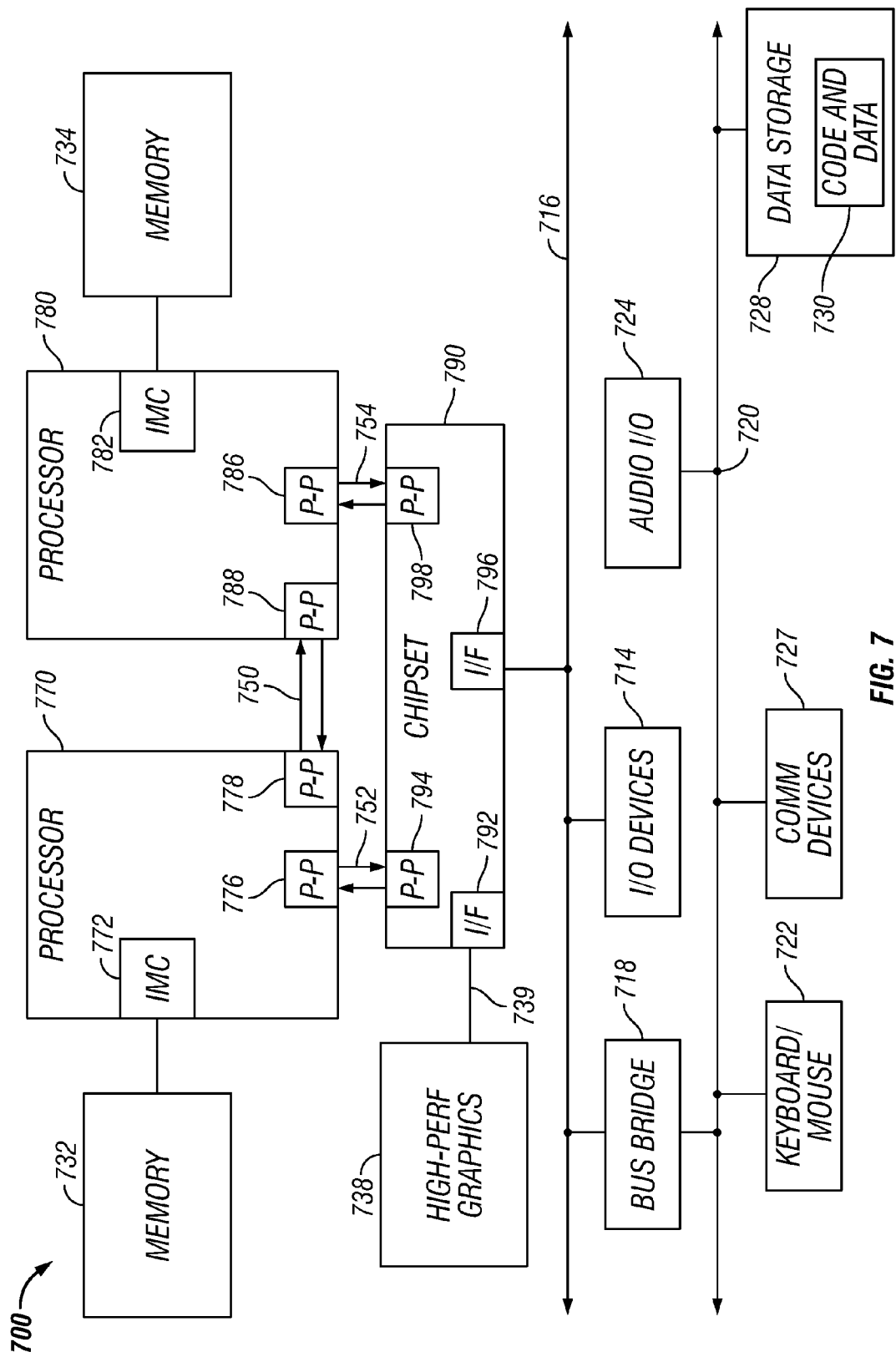
FIG. 7 is a block diagram of a second system, in accordance with embodiments of the present disclosure.
Figure 8:
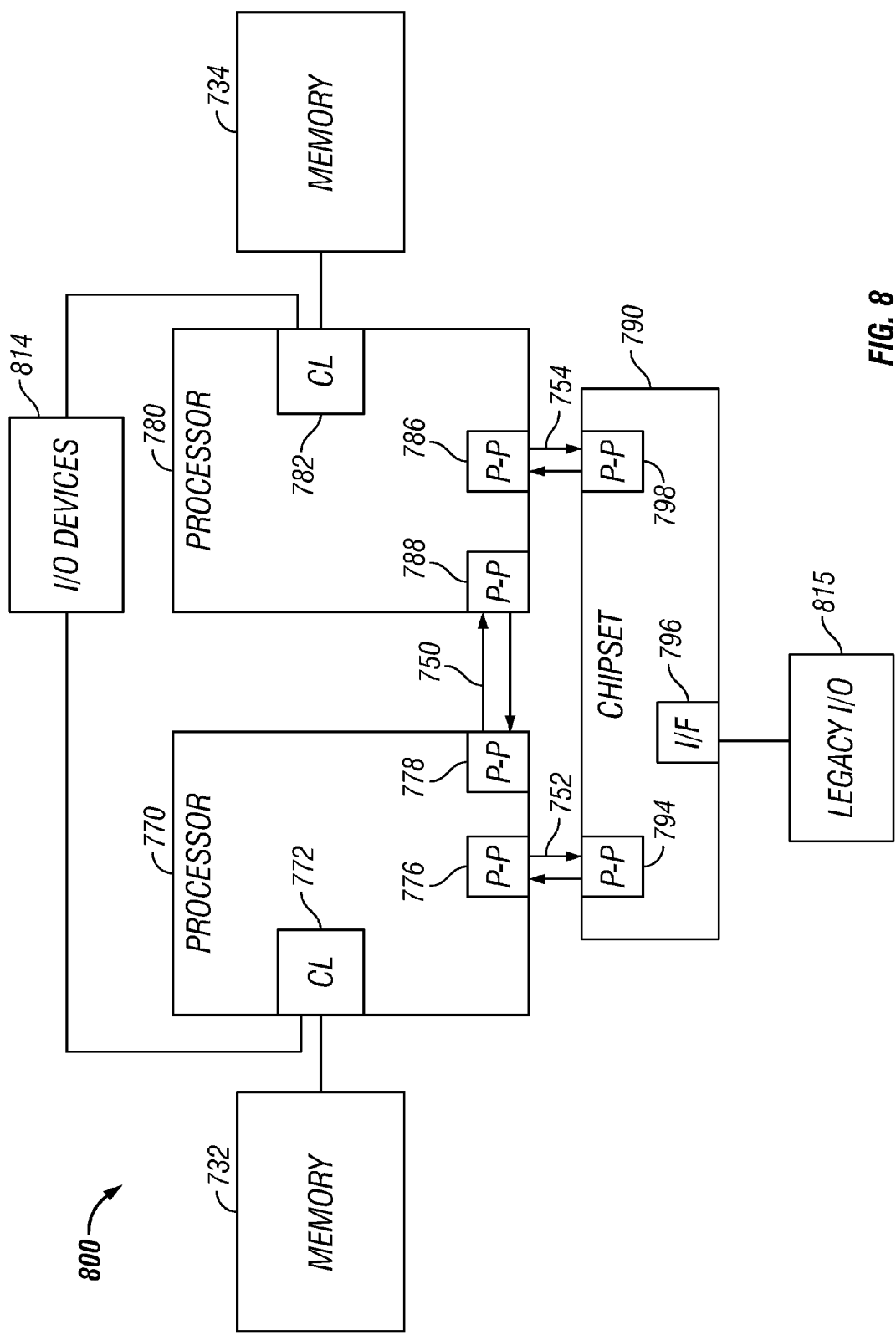
FIG. 8 is a block diagram of a third system in accordance with embodiments of the present disclosure.
Figure 9:
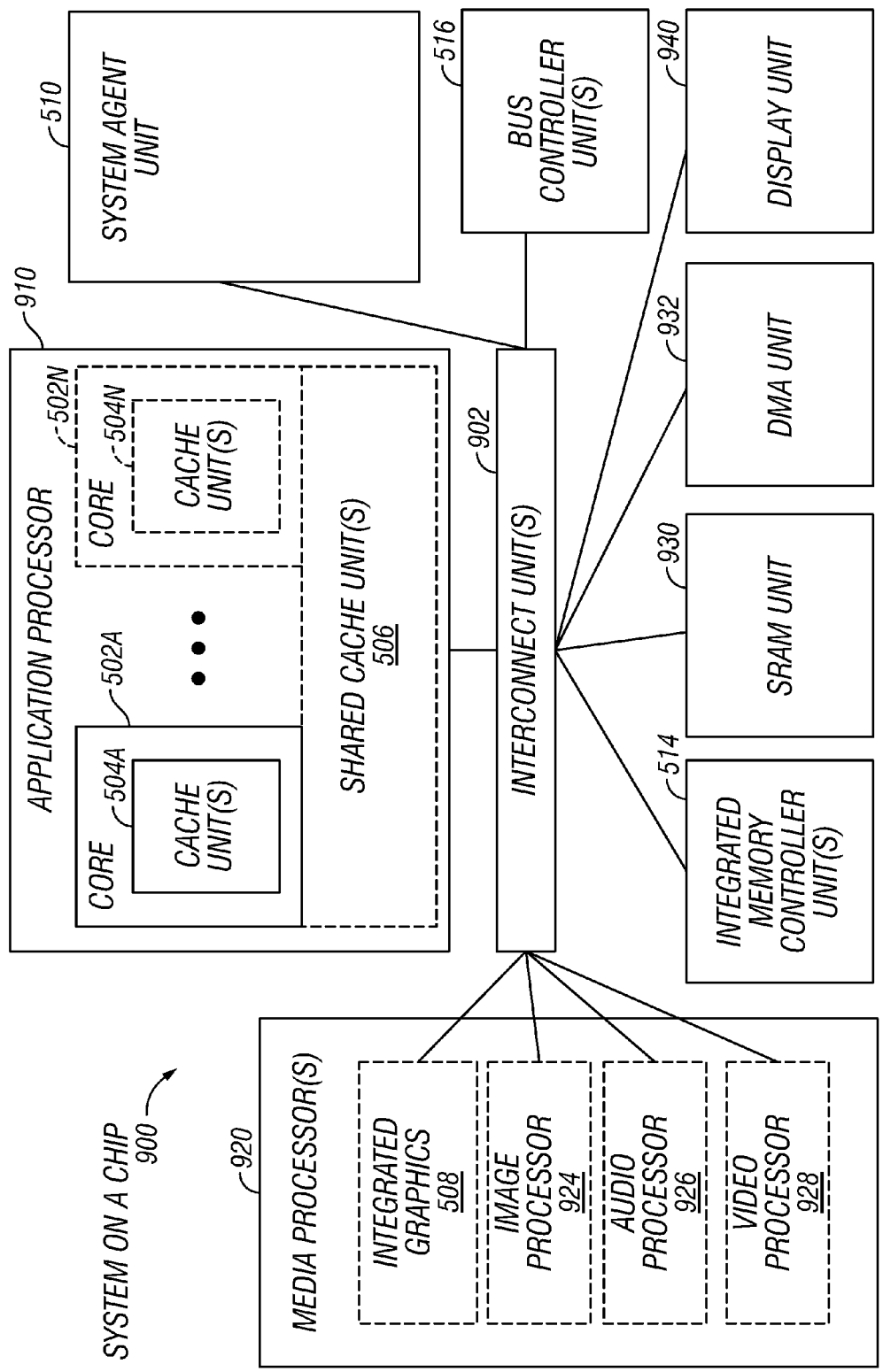
FIG. 9 is a block diagram of a system-on-a-chip, in accordance with embodiments of the present disclosure.

FIGS. 6-8 may illustrate exemplary systems suitable for including processor 500, while FIG. 9 may illustrate an exemplary system on a chip (SoC) that may include one or more of cores 502. Other system designs and implementations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 6 illustrates a block diagram of a system 600, in accordance with embodiments of the present disclosure. System 600 may include one or more processors 610, 615, which may be coupled to graphics memory controller hub (GMCH) 620. The optional nature of additional processors 615 is denoted in FIG. 6 with broken lines.

Each processor 610,615 may be some version of processor 500. However, it should be noted that integrated graphics logic and integrated memory control units might not exist in processors 610,615. FIG. 6 illustrates that GMCH 620 may be coupled to a memory 640 that may be, for example, a dynamic random access memory (DRAM). The DRAM may, for at least one embodiment, be associated with a non-volatile cache.

GMCH 620 may be a chipset, or a portion of a chipset. GMCH 620 may communicate with processors 610, 615 and control interaction between processors 610, 615 and memory 640. GMCH 620 may also act as an accelerated bus interface between the processors 610, 615 and other elements of system 600. In one embodiment, GMCH 620 communicates with processors 610, 615 via a multi-drop bus, such as a frontside bus (FSB) 695.

Furthermore, GMCH 620 may be coupled to a display 645 (such as a flat panel display). In one embodiment, GMCH 620 may include an integrated graphics accelerator. GMCH 620 may be further coupled to an input/output (I/O) controller hub (ICH) 650, which may be used to couple various peripheral devices to system 600. External graphics device 660 may include be a discrete graphics device coupled to ICH 650 along with another peripheral device 670.

In other embodiments, additional or different processors may also be present in system 600. For example, additional processors 610, 615 may include additional processors that may be the same as processor 610, additional processors that may be heterogeneous or asymmetric to processor 610, accelerators (such as, e.g., graphics accelerators or digital signal processing (DSP) units), field programmable gate arrays, or any other processor. There may be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst processors 610, 615. For at least one embodiment, various processors 610, 615 may reside in the same die package.

FIG. 7 illustrates a block diagram of a second system 700, in accordance with embodiments of the present disclosure. As shown in FIG. 7, multiprocessor system 700 may include a point-to-point interconnect system, and may include a first processor 770 and a second processor 780 coupled via a point-to-point interconnect 750. Each of processors 770 and 780 may be some version of processor 500 as one or more of processors 610, 615.

While FIG. 7 may illustrate two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 may also include as part of its bus controller units point-to-point (P-P) interfaces 776 and 778; similarly, second processor 780 may include P-P interfaces 786 and 788. Processors 770, 780 may exchange information via a point-to-point (P-P) interface 750 using P-P interface circuits 778, 788. As shown in FIG. 7, IMCs 772 and 782 may couple the processors to respective memories, namely a memory 732 and a memory 734, which in one embodiment may be portions of main memory locally attached to the respective processors.

Processors 770, 780 may each exchange information with a chipset 790 via individual P-P interfaces 752, 754 using point to point interface circuits 776, 794, 786, 798. In one embodiment, chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures may be possible. For example, instead of the point-to-point architecture of FIG. 7, a system may implement a multi-drop bus or other such architecture.

FIG. 8 illustrates a block diagram of a third system 800 in accordance with embodiments of the present disclosure. Like elements in FIGS. 7 and 8 bear like reference numerals, and certain aspects of FIG. 7 have been omitted from FIG. 8 in order to avoid obscuring other aspects of FIG. 8.

FIG. 8 illustrates that processors 870, 880 may include integrated memory and I/O control logic ("CL") 872 and 882, respectively. For at least one embodiment, CL 872, 882 may include integrated memory controller units such as that described above in connection with FIGS. 5 and 7. In addition. CL 872, 882 may also include I/O control logic. FIG. 8 illustrates that not only memories 832, 834 may be coupled to CL 872, 882, but also that I/O devices 814 may also be coupled to control logic 872, 882. Legacy I/O devices 815 may be coupled to chipset 890.

FIG. 9 illustrates a block diagram of a SoC 900, in accordance with embodiments of the present disclosure. Similar elements in FIG. 5 bear like reference numerals. Also, dashed lined boxes may represent optional features on more advanced SoCs. An interconnect units 902 may be coupled to: an application processor 910 which may include a set of one or more cores 902A-N and shared cache units 906; a system agent unit 910; a bus controller units 916; an integrated memory controller units 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
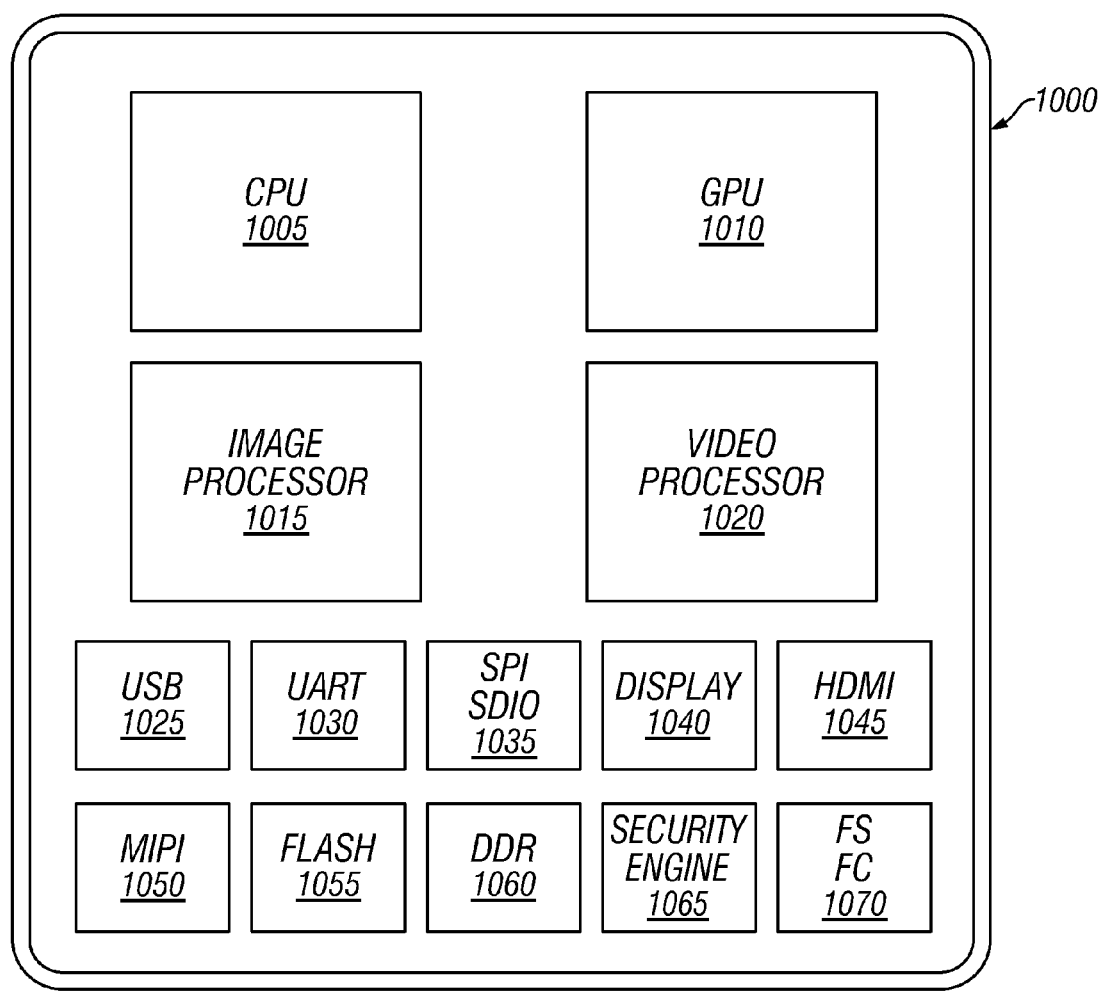
FIG. 10 illustrates a processor containing a central processing unit and a graphics processing unit which may perform at least one instruction, in accordance with embodiments of the present disclosure.

FIG. 10 illustrates a processor containing a central processing unit (CPU) and a graphics processing unit (GPU), which may perform at least one instruction, in accordance with embodiments of the present disclosure. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and $I^2S/I^2C$ controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine-readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
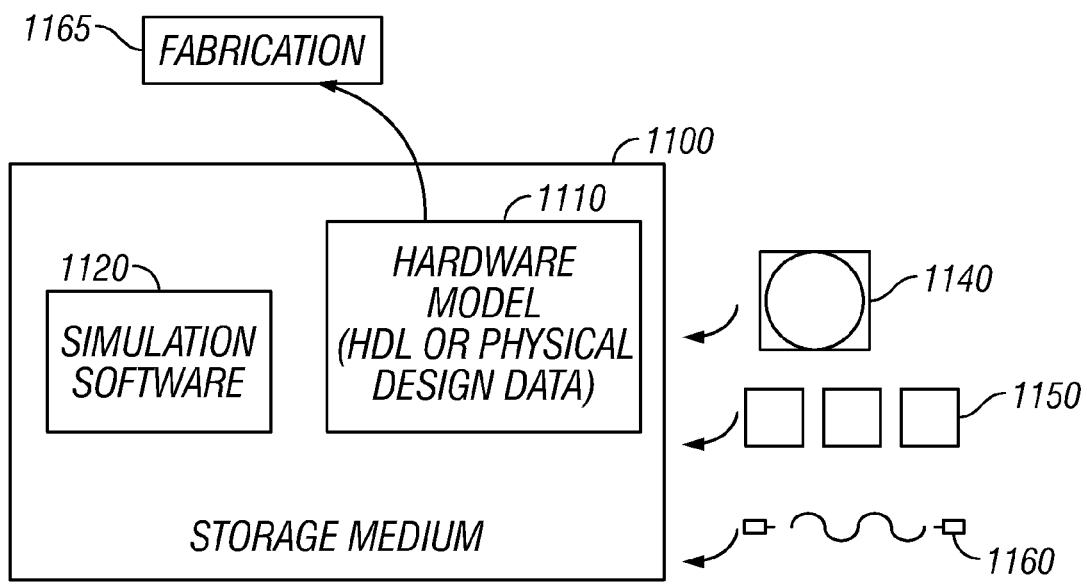
FIG. 11 is a block diagram illustrating the development of IP cores, in accordance with embodiments of the present disclosure.

FIG. 11 illustrates a block diagram illustrating the development of IP cores, in accordance with embodiments of the present disclosure. Storage 1130 may include simulation software 1120 and/or hardware or software model 1110. In one embodiment, the data representing the IP core design may be provided to storage 1130 via memory 1140 (e.g., hard disk), wired connection (e.g., internet) 1150 or wireless connection 1160. The IP core information generated by the simulation tool and model may then be transmitted to a fabrication facility where it may be fabricated by a $3^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
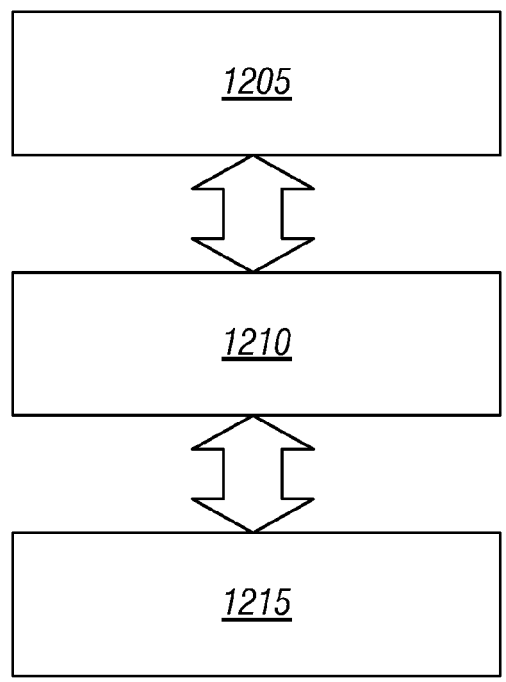
FIG. 12 illustrates how an instruction of a first type may be emulated by a processor of a different type, in accordance with embodiments of the present disclosure.

FIG. 12 illustrates how an instruction of a first type may be emulated by a processor of a different type, in accordance with embodiments of the present disclosure. In FIG. 12, program 1205 contains some instructions that may perform the same or substantially the same function as an instruction according to one embodiment. However the instructions of program 1205 may be of a type and/or format that is different from or incompatible with processor 1215, meaning the instructions of the type in program 1205 may not be able to execute natively by the processor 1215. However, with the help of emulation logic, 1210, the instructions of program 1205 may be translated into instructions that may be natively be executed by the processor 1215. In one embodiment, the emulation logic may be embodied in hardware. In another embodiment, the emulation logic may be embodied in a tangible, machine-readable medium containing software to translate instructions of the type in program 1205 into the type natively executable by processor 1215. In other embodiments, emulation logic may be a combination of fixed-function or programmable hardware and a program stored on a tangible, machine-readable medium. In one embodiment, the processor contains the emulation logic, whereas in other embodiments, the emulation logic exists outside of the processor and may be provided by a third party. In one embodiment, the processor may load the emulation logic embodied in a tangible, machine-readable medium containing software by executing microcode or firmware contained in or associated with the processor.

Figure 13:
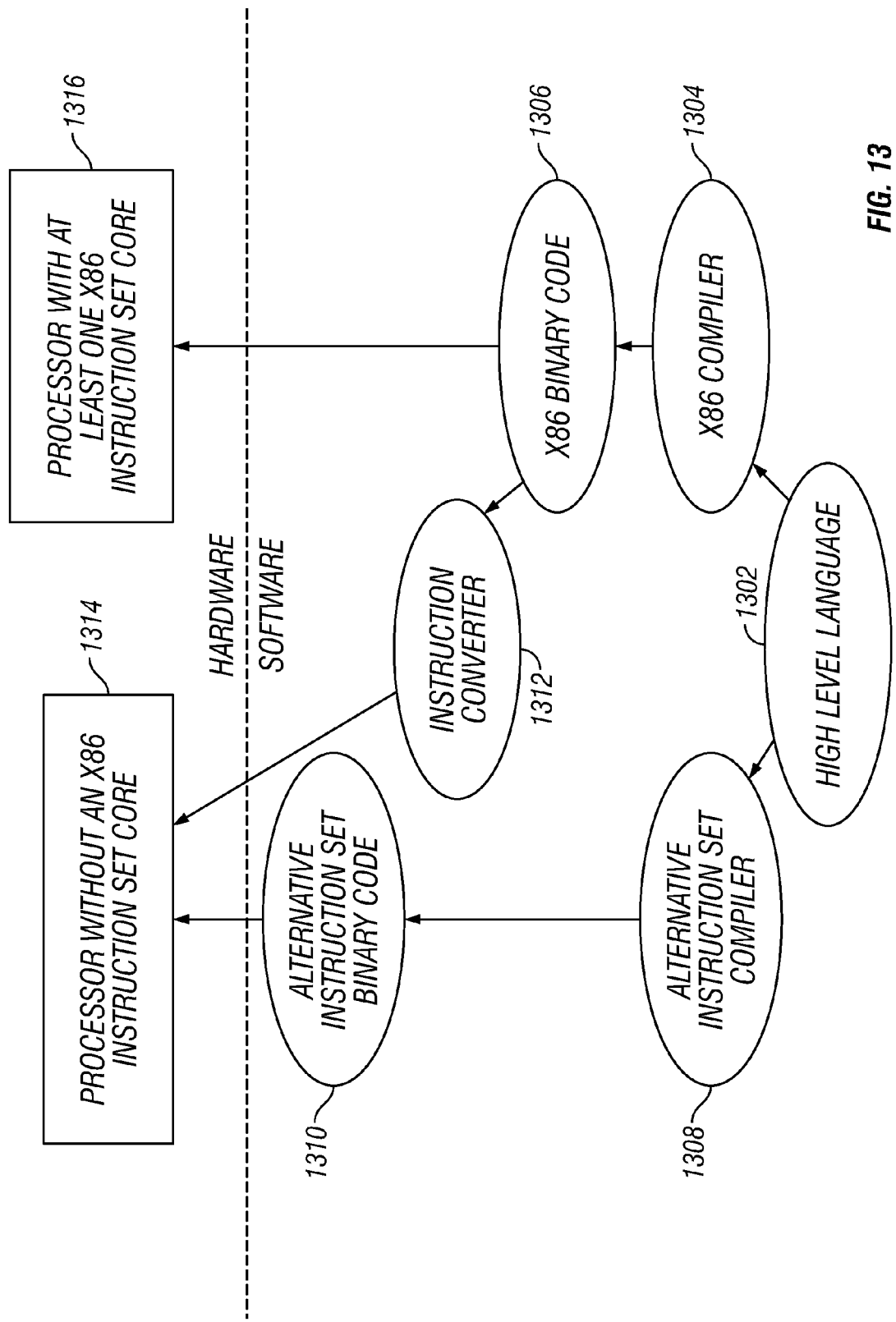
FIG. 13 illustrates a block diagram contrasting the use of a software instruction converter to convert binary instructions in a source instruction set to binary instructions in a target instruction set, in accordance with embodiments of the present disclosure.

FIG. 13 illustrates a block diagram contrasting the use of a software instruction converter to convert binary instructions in a source instruction set to binary instructions in a target instruction set, in accordance with embodiments of the present disclosure. In the illustrated embodiment, the instruction converter may be a software instruction converter, although the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that may perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. x86 compiler 1304 represents a compiler that may be operable to generate x86 binary code 1306 (e.g., object code) that may, with or without additional linkage processing, be executed on the processor with at least one x86 instruction set core 1316. Similarly, FIG. 13 shows the program in high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1312 may be used to convert x86 binary code 1306 into code that may be natively executed by the processor without an x86 instruction set core 1314. This converted code might not be the same as alternative instruction set binary code 1310; however, the converted code will accomplish the general operation and be made up of instructions from the alternative instruction set. Thus, instruction converter 1312 represents software, firmware, hardware, or a combination thereof that, through emulation, simulation or any other process, allows a processor or other electronic device that does not have an x86 instruction set processor or core to execute x86 binary code 1306.

Figure 14:
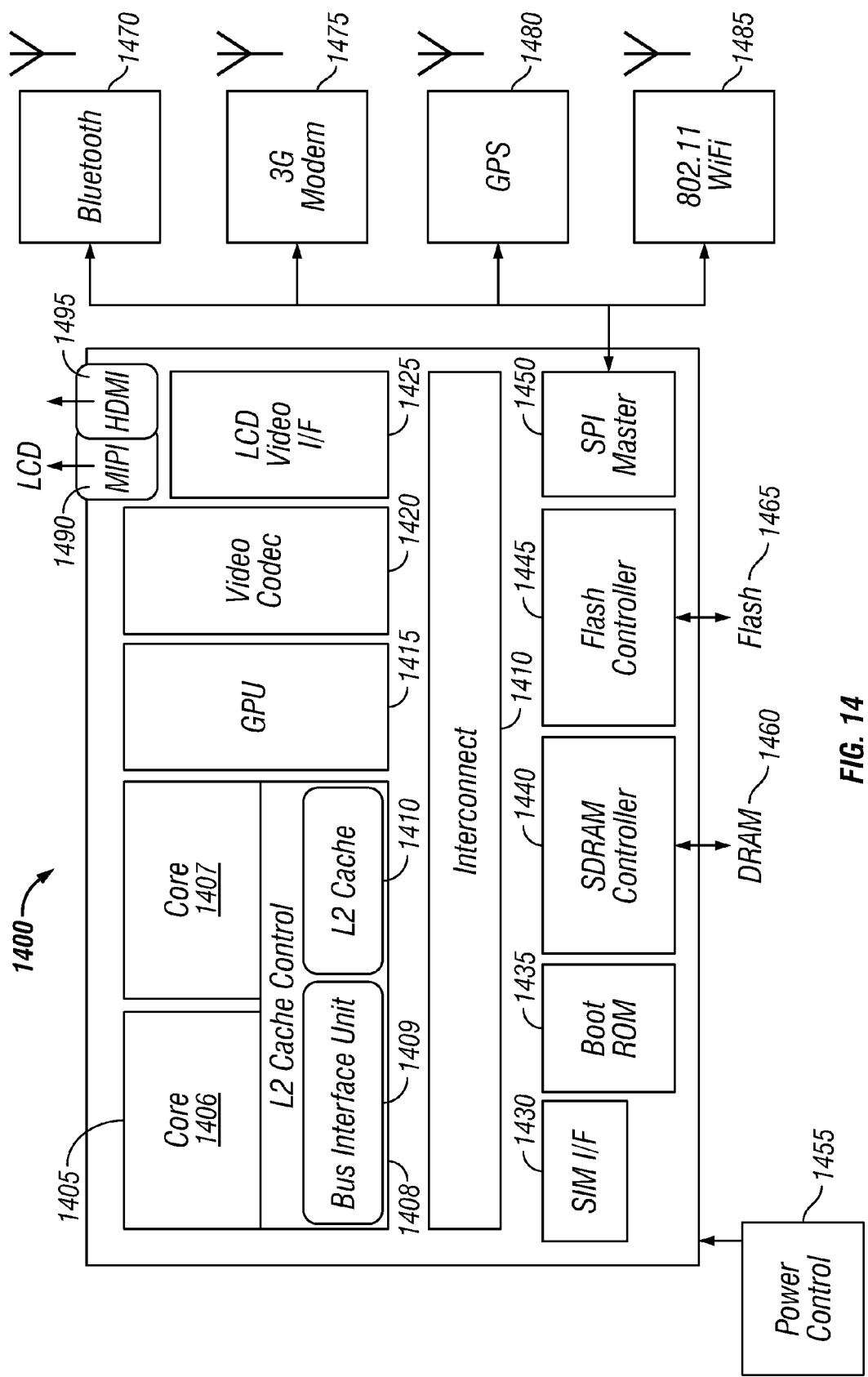
FIG. 14 is a block diagram of an instruction set architecture of a processor, in accordance with embodiments of the present disclosure.

FIG. 14 is a block diagram of an instruction set architecture 1400 of a processor, in accordance with embodiments of the present disclosure. Instruction set architecture 1400 may include any suitable number or kind of components.

For example, instruction set architecture 1400 may include processing entities such as one or more cores 1406, 1407 and a graphics processing unit 1415. Cores 1406, 1407 may be communicatively coupled to the rest of instruction set architecture 1400 through any suitable mechanism, such as through a bus or cache. In one embodiment, cores 1406, 1407 may be communicatively coupled through an L2 cache control 1408, which may include a bus interface unit 1409 and an L2 cache 1410. Cores 1406, 1407 and graphics processing unit 1415 may be communicatively coupled to each other and to the remainder of instruction set architecture 1400 through interconnect 1410. In one embodiment, graphics processing unit 1415 may use a video code 1420 defining the manner in which particular video signals will be encoded and decoded for output.

Instruction set architecture 1400 may also include any number or kind of interfaces, controllers, or other mechanisms for interfacing or communicating with other portions of an electronic device or system. Such mechanisms may facilitate interaction with, for example, peripherals, communications devices, other processors, or memory. In the example of FIG. 14, instruction set architecture 1400 may include a liquid crystal display (LCD) video interface 1425, a subscriber interface module (SIM) interface 1430, a boot ROM interface 1435, a synchronous dynamic random access memory (SDRAM) controller 1440, a flash controller 1445, and a serial peripheral interface (SPI) master unit 1450. LCD video interface 1425 may provide output of video signals from, for example, GPU 1415 and through, for example, a mobile industry processor interface (MIPI) 1490 or a high-definition multimedia interface (HDMI) 1495 to a display. Such a display may include, for example, an LCD. SIM interface 1430 may provide access to or from a SIM card or device. SDRAM controller 1440 may provide access to or from memory such as an SDRAM chip or module. Flash controller 1445 may provide access to or from memory such as flash memory or other instances of RAM. SPI master unit 1450 may provide access to or from communications modules, such as a Bluetooth module 1470, high-speed 3G modem 1475, global positioning system module 1480, or wireless module 1485 implementing a communications standard such as 802.11.

Figure 15:
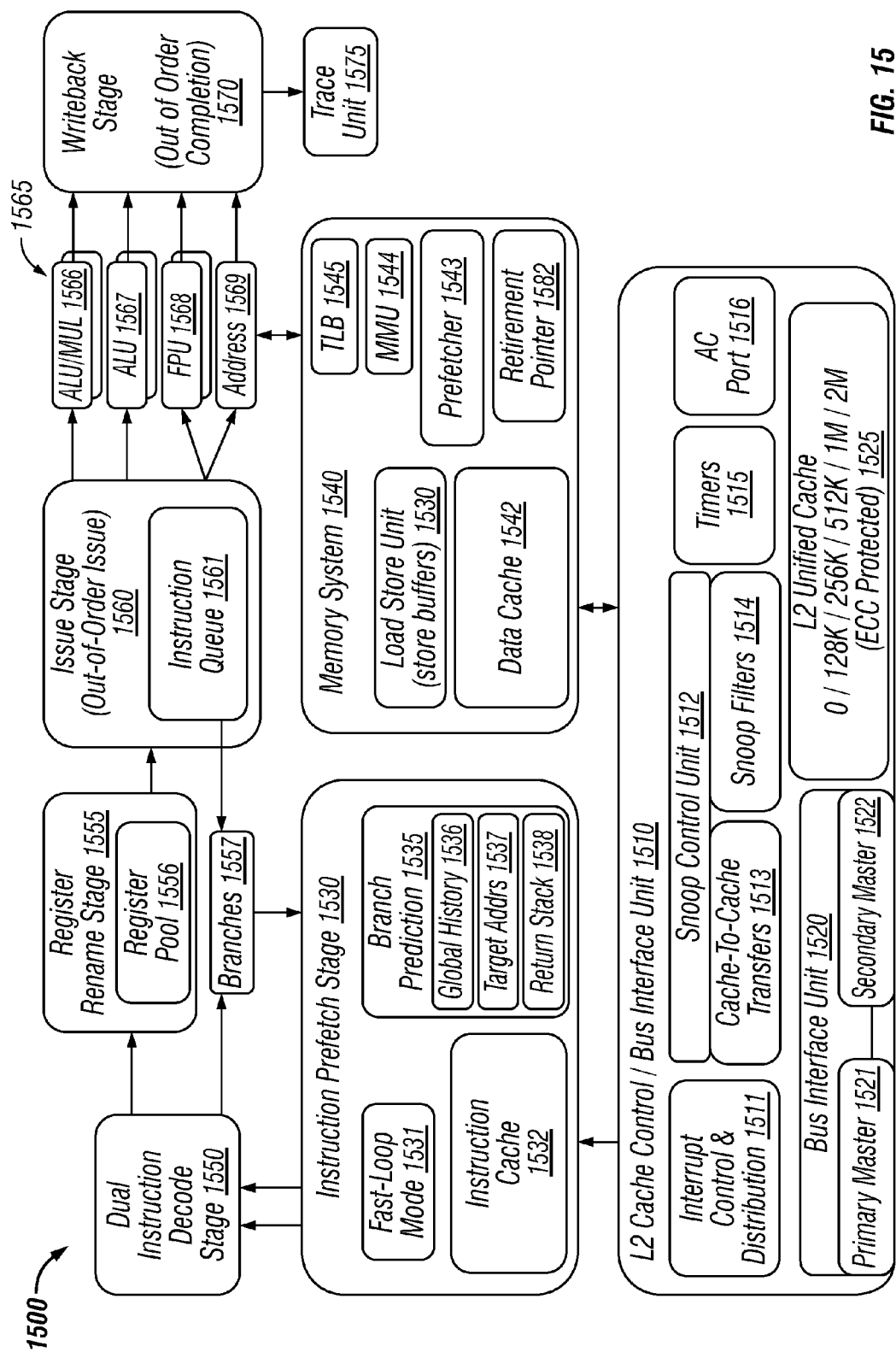
FIG. 15 is a more detailed block diagram of an instruction set architecture of a processor, in accordance with embodiments of the present disclosure.

FIG. 15 is a more detailed block diagram of an instruction set architecture 1500 of a processor, in accordance with embodiments of the present disclosure. Instruction architecture 1500 may implement one or more aspects of instruction set architecture 1400. Furthermore, instruction set architecture 1500 may illustrate modules and mechanisms for the execution of instructions within a processor.

Instruction architecture 1500 may include a memory system 1540 communicatively coupled to one or more execution entities 1565. Furthermore, instruction architecture 1500 may include a caching and bus interface unit such as unit 1510 communicatively coupled to execution entities 1565 and memory system 1540. In one embodiment, loading of instructions into execution entities 1564 may be performed by one or more stages of execution. Such stages may include, for example, instruction prefetch stage 1530, dual instruction decode stage 1550, register rename stage 155, issue stage 1560, and writeback stage 1570.

In one embodiment, memory system 1540 may include an executed instruction pointer 1580. Executed instruction pointer 1580 may store a value identifying the oldest, undispatched instruction within a batch of instructions. The oldest instruction may correspond to the lowest Program Order (PO) value. A PO may include a unique number of an instruction. Such an instruction may be a single instruction within a thread represented by multiple strands. A PO may be used in ordering instructions to ensure correct execution semantics of code. A PO may be reconstructed by mechanisms such as evaluating increments to PO encoded in the instruction rather than an absolute value. Such a reconstructed PO may be known as an "RPO." Although a PO may be referenced herein, such a PO may be used interchangeably with an RPO. A strand may include a sequence of instructions that are data dependent upon each other. The strand may be arranged by a binary translator at compilation time. Hardware executing a strand may execute the instructions of a given strand in order according to PO of the various instructions. A thread may include multiple strands such that instructions of different strands may depend upon each other. A PO of a given strand may be the PO of the oldest instruction in the strand which has not yet been dispatched to execution from an issue stage. Accordingly, given a thread of multiple strands, each strand including instructions ordered by PO, executed instruction pointer 1580 may store the oldest—illustrated by the lowest number—PO in the thread.

In another embodiment, memory system 1540 may include a retirement pointer 1582. Retirement pointer 1582 may store a value identifying the PO of the last retired instruction. Retirement pointer 1582 may be set by, for example, retirement unit 454. If no instructions have yet been retired, retirement pointer 1582 may include a null value.

Execution entities 1565 may include any suitable number and kind of mechanisms by which a processor may execute instructions. In the example of FIG. 15, execution entities 1565 may include ALU/multiplication units (MUL) 1566, ALUs 1567, and floating point units (FPU) 1568. In one embodiment, such entities may make use of information contained within a given address 1569. Execution entities 1565 in combination with stages 1530, 1550, 1555, 1560, 1570 may collectively form an execution unit.

Unit 1510 may be implemented in any suitable manner. In one embodiment, unit 1510 may perform cache control. In such an embodiment, unit 1510 may thus include a cache 1525. Cache 1525 may be implemented, in a further embodiment, as an L2 unified cache with any suitable size, such as zero, 128 k, 256 k, 512 k, 1 M, or 2 M bytes of memory. In another, further embodiment, cache 1525 may be implemented in error-correcting code memory. In another embodiment, unit 1510 may perform bus interfacing to other portions of a processor or electronic device. In such an embodiment, unit 1510 may thus include a bus interface unit 1520 for communicating over an interconnect, intraprocessor bus, interprocessor bus, or other communication bus, port, or line. Bus interface unit 1520 may provide interfacing in order to perform, for example, generation of the memory and input/output addresses for the transfer of data between execution entities 1565 and the portions of a system external to instruction architecture 1500.

To further facilitate its functions, bus interface unit 1520 may include an interrupt control and distribution unit 1511 for generating interrupts and other communications to other portions of a processor or electronic device. In one embodiment, bus interface unit 1520 may include a snoop control unit 1512 that handles cache access and coherency for multiple processing cores. In a further embodiment, to provide such functionality, snoop control unit 1512 may include a cache-to-cache transfer unit that handles information exchanges between different caches. In another, further embodiment, snoop control unit 1512 may include one or more snoop filters 1514 that monitors the coherency of other caches (not shown) so that a cache controller, such as unit 1510, does not have to perform such monitoring directly. Unit 1510 may include any suitable number of timers 1515 for synchronizing the actions of instruction architecture 1500. Also, unit 1510 may include an AC port 1516.

Memory system 1540 may include any suitable number and kind of mechanisms for storing information for the processing needs of instruction architecture 1500. In one embodiment, memory system 1504 may include a load store unit 1530 for storing information such as buffers written to or read back from memory or registers. In another embodiment, memory system 1504 may include a translation lookaside buffer (TLB) 1545 that provides look-up of address values between physical and virtual addresses. In yet another embodiment, bus interface unit 1520 may include a memory management unit (MMU) 1544 for facilitating access to virtual memory. In still yet another embodiment, memory system 1504 may include a prefetcher 1543 for requesting instructions from memory before such instructions are actually needed to be executed, in order to reduce latency.

The operation of instruction architecture 1500 to execute an instruction may be performed through different stages. For example, using unit 1510 instruction prefetch stage 1530 may access an instruction through prefetcher 1543. Instructions retrieved may be stored in instruction cache 1532. Prefetch stage 1530 may enable an option 1531 for fast-loop mode, wherein a series of instructions forming a loop that is small enough to fit within a given cache are executed. In one embodiment, such an execution may be performed without needing to access additional instructions from, for example, instruction cache 1532. Determination of what instructions to prefetch may be made by, for example, branch prediction unit 1535, which may access indications of execution in global history 1536, indications of target addresses 1537, or contents of a return stack 1538 to determine which of branches 1557 of code will be executed next. Such branches may be possibly prefetched as a result. Branches 1557 may be produced through other stages of operation as described below. Instruction prefetch stage 1530 may provide instructions as well as any predictions about future instructions to dual instruction decode stage.

Dual instruction decode stage 1550 may translate a received instruction into microcode-based instructions that may be executed. Dual instruction decode stage 1550 may simultaneously decode two instructions per clock cycle. Furthermore, dual instruction decode stage 1550 may pass its results to register rename stage 1555. In addition, dual instruction decode stage 1550 may determine any resulting branches from its decoding and eventual execution of the microcode. Such results may be input into branches 1557.

Register rename stage 1555 may translate references to virtual registers or other resources into references to physical registers or resources. Register rename stage 1555 may include indications of such mapping in a register pool 1556. Register rename stage 1555 may alter the instructions as received and send the result to issue stage 1560.

Issue stage 1560 may issue or dispatch commands to execution entities 1565. Such issuance may be performed in an out-of-order fashion. In one embodiment, multiple instructions may be held at issue stage 1560 before being executed. Issue stage 1560 may include an instruction queue 1561 for holding such multiple commands. Instructions may be issued by issue stage 1560 to a particular processing entity 1565 based upon any acceptable criteria, such as availability or suitability of resources for execution of a given instruction. In one embodiment, issue stage 1560 may reorder the instructions within instruction queue 1561 such that the first instructions received might not be the first instructions executed. Based upon the ordering of instruction queue 1561, additional branching information may be provided to branches 1557. Issue stage 1560 may pass instructions to executing entities 1565 for execution.

Upon execution, writeback stage 1570 may write data into registers, queues, or other structures of instruction set architecture 1500 to communicate the completion of a given command. Depending upon the order of instructions arranged in issue stage 1560, the operation of writeback stage 1570 may enable additional instructions to be executed. Performance of instruction set architecture 1500 may be monitored or debugged by trace unit 1575.

Figure 16:
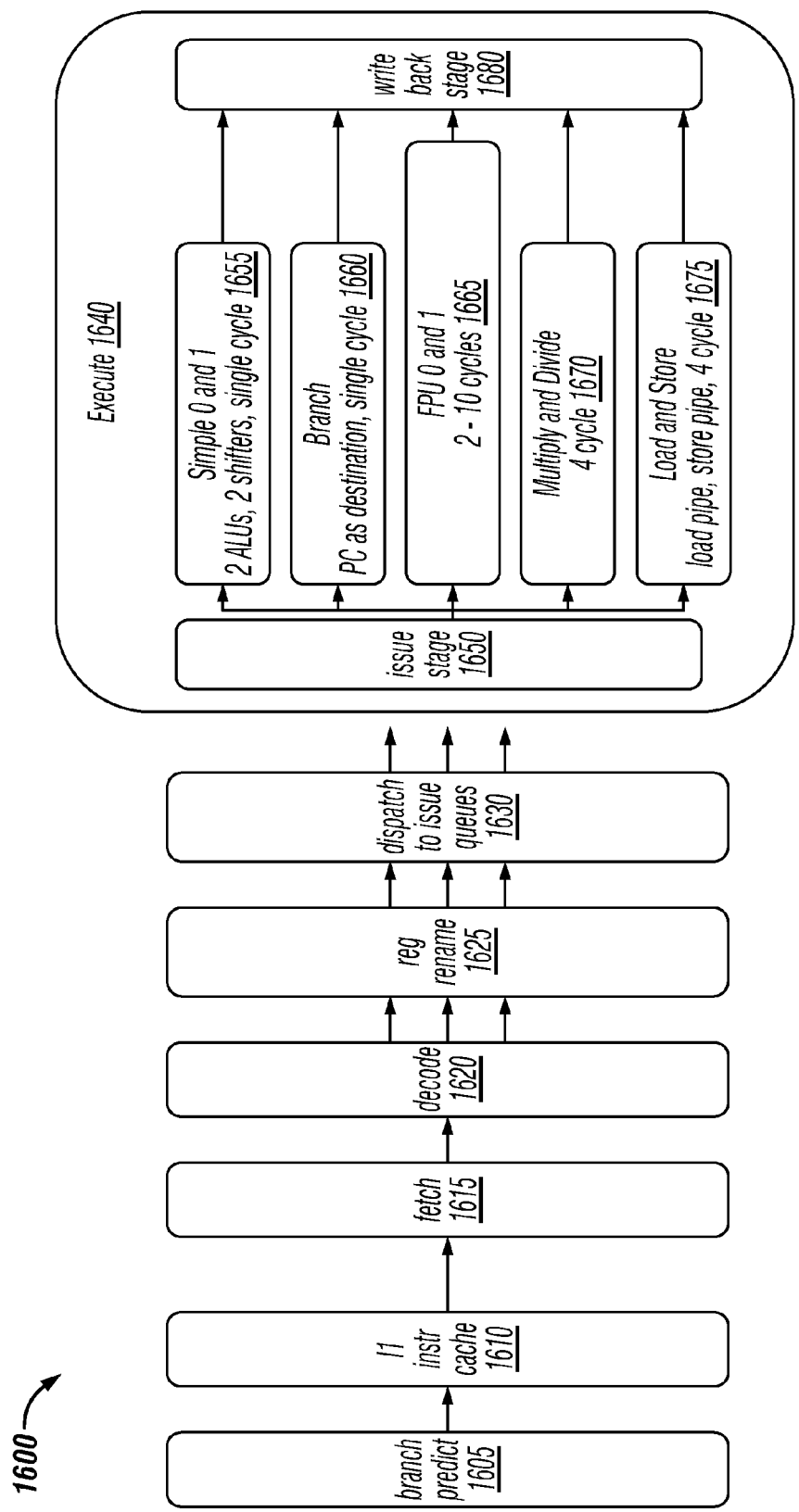
FIG. 16 is a block diagram of an execution pipeline for an instruction set architecture of a processor, in accordance with embodiments of the present disclosure.

FIG. 16 is a block diagram of an execution pipeline 1600 for an instruction set architecture of a processor, in accordance with embodiments of the present disclosure. Execution pipeline 1600 may illustrate operation of, for example, instruction architecture 1500 of FIG. 15.

Execution pipeline 1600 may include any suitable combination of steps or operations. In 1605, predictions of the branch that is to be executed next may be made. In one embodiment, such predictions may be based upon previous executions of instructions and the results thereof. In 1610, instructions corresponding to the predicted branch of execution may be loaded into an instruction cache. In 1615, one or more such instructions in the instruction cache may be fetched for execution. In 1620, the instructions that have been fetched may be decoded into microcode or more specific machine language. In one embodiment, multiple instructions may be simultaneously decoded. In 1625, references to registers or other resources within the decoded instructions may be reassigned. For example, references to virtual registers may be replaced with references to corresponding physical registers. In 1630, the instructions may be dispatched to queues for execution. In 1640, the instructions may be executed. Such execution may be performed in any suitable manner. In 1650, the instructions may be issued to a suitable execution entity. The manner in which the instruction is executed may depend upon the specific entity executing the instruction. For example, at 1655, an ALU may perform arithmetic functions. The ALU may utilize a single clock cycle for its operation, as well as two shifters. In one embodiment, two ALUs may be employed, and thus two instructions may be executed at 1655. At 1660, a determination of a resulting branch may be made. A program counter may be used to designate the destination to which the branch will be made. 1660 may be executed within a single clock cycle. At 1665, floating point arithmetic may be performed by one or more FPUs. The floating point operation may require multiple clock cycles to execute, such as two to ten cycles. At 1670, multiplication and division operations may be performed. Such operations may be performed in four clock cycles. At 1675, loading and storing operations to registers or other portions of pipeline 1600 may be performed. The operations may include loading and storing addresses. Such operations may be performed in four clock cycles. At 1680, write-back operations may be performed as required by the resulting operations of 1655-1675.

Figure 17:
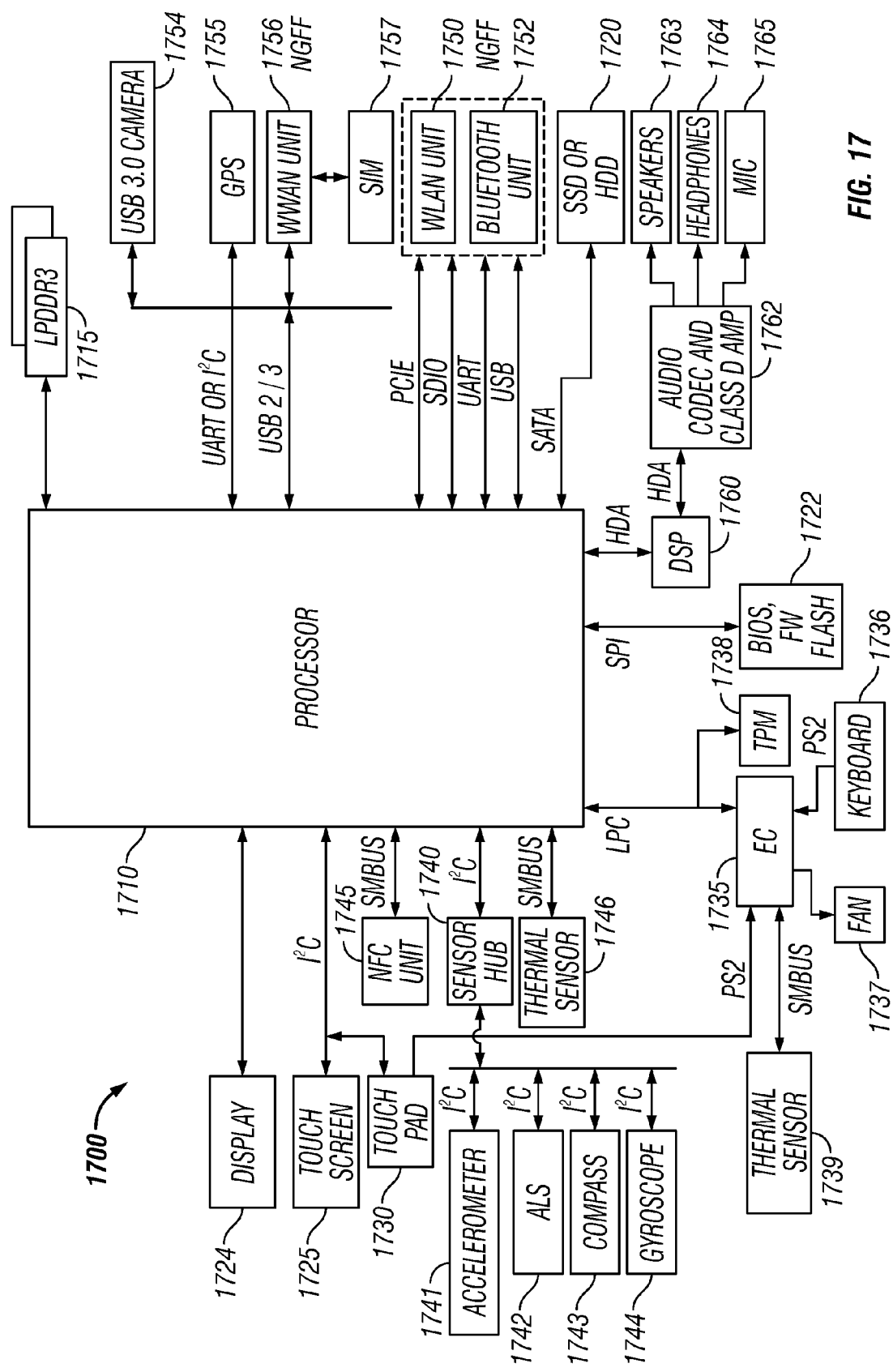
FIG. 17 is a block diagram of an electronic device for utilizing a processor, in accordance with embodiments of the present disclosure.

FIG. 17 is a block diagram of an electronic device 1700 for utilizing a processor 1710, in accordance with embodiments of the present disclosure. Electronic device 1700 may include, for example, a notebook, an ultrabook, a computer, a tower server, a rack server, a blade server, a laptop, a desktop, a tablet, a mobile device, a phone, an embedded computer, or any other suitable electronic device.

Electronic device 1700 may include processor 1710 communicatively coupled to any suitable number or kind of components, peripherals, modules, or devices. Such coupling may be accomplished by any suitable kind of bus or interface, such as I$^2$C bus, system management bus (SMBus), low pin count (LPC) bus, SPI, high definition audio (HDA) bus, Serial Advance Technology Attachment (SATA) bus, USB bus (versions 1, 2, 3), or Universal Asynchronous Receiver/Transmitter (UART) bus.

Such components may include, for example, a display 1724, a touch screen 1725, a touch pad 1730, a near field communications (NFC) unit 1745, a sensor hub 1740, a thermal sensor 1746, an express chipset (EC) 1735, a trusted platform module (TPM) 1738, BIOS/firmware/flash memory 1722, a digital signal processor 1760, a drive 1720 such as a solid state disk (SSD) or a hard disk drive (HDD), a wireless local area network (WLAN) unit 1750, a Bluetooth unit 1752, a wireless wide area network (WWAN) unit 1756, a global positioning system (GPS), a camera 1754 such as a USB 3.0 camera, or a low power double data rate (LPDDR) memory unit 1715 implemented in, for example, the LPDDR3 standard. These components may each be implemented in any suitable manner.

Furthermore, in various embodiments other components may be communicatively coupled to processor 1710 through the components discussed above. For example, an accelerometer 1741, ambient light sensor (ALS) 1742, compass 1743, and gyroscope 1744 may be communicatively coupled to sensor hub 1740. A thermal sensor 1739, fan 1737, keyboard 1746, and touch pad 1730 may be communicatively coupled to EC 1735. Speaker 1763, headphones 1764, and a microphone 1765 may be communicatively coupled to an audio unit 1764, which may in turn be communicatively coupled to DSP 1760. Audio unit 1764 may include, for example, an audio codec and a class D amplifier. A SIM card 1757 may be communicatively coupled to WWAN unit 1756. Components such as WLAN unit 1750 and Bluetooth unit 1752, as well as WWAN unit 1756 may be implemented in a next generation form factor (NGFF).

Figure 18:
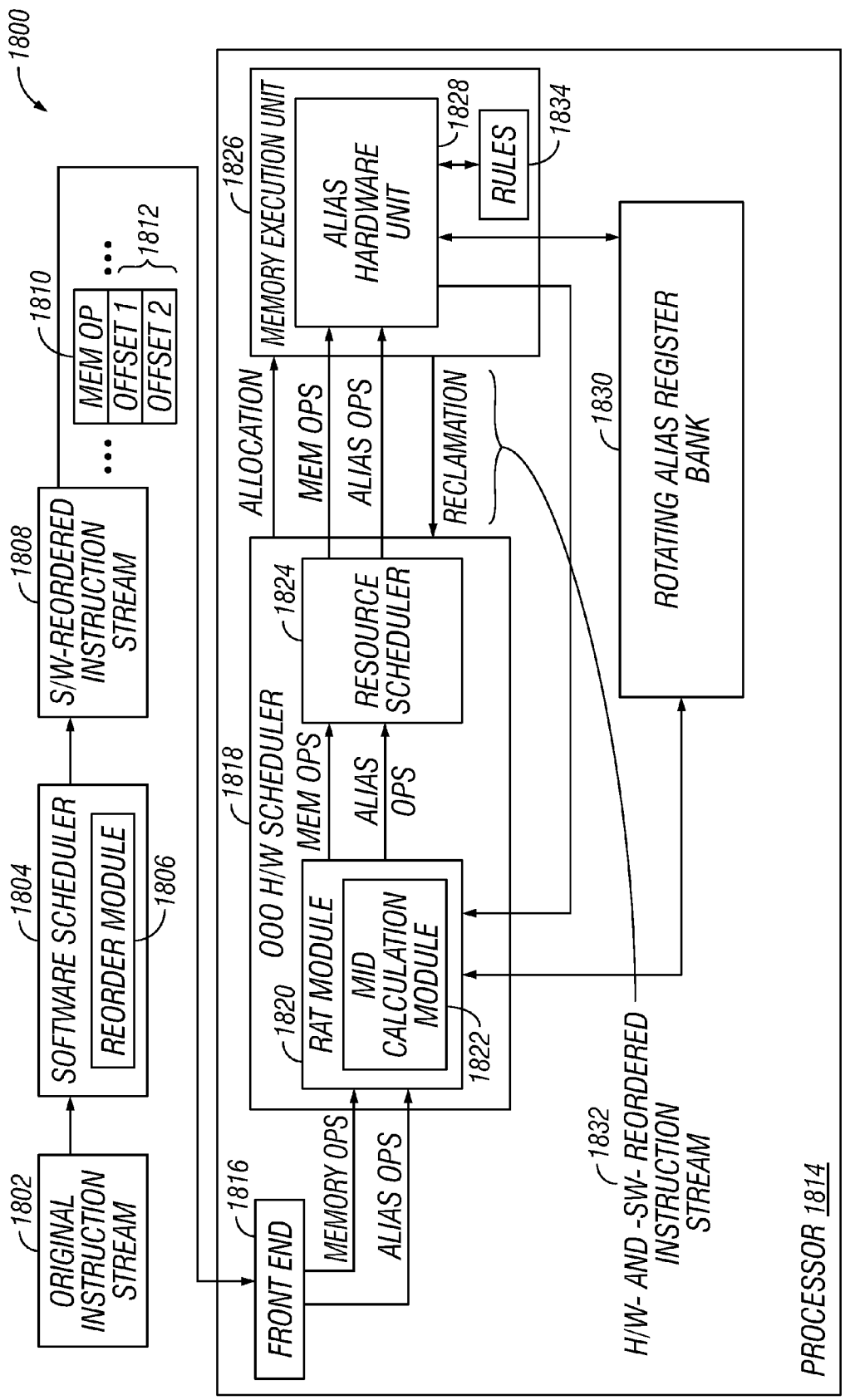
FIG. 18 is a block diagram of a system for implementing an instruction and logic for memory disambiguation, in accordance with embodiments of the present disclosure.

Embodiments of the present disclosure involve an instruction and logic for memory disambiguation in an out-of-order processor. Such memory disambiguation may be performed without use of a memory order buffer. FIG. 18 is a block diagram of a system 1800 for implementing an instruction and logic for memory disambiguation, in accordance with embodiments of the present disclosure.

In some processors, a memory order buffer may be used to reconstruct an original program order (PO) for memory operations that have been reordered by out-of-order scheduling hardware. However, such a memory order buffer may be unable to reconstruct program order for memory operations that have been reordered by software schedulers. Such software schedulers may be present in, for example, just-in-time compiles or binary translators that may then provide resultant, software-reordered code to hardware. Software schedulers provide reordering that may identify and issue critical memory operation atoms much sooner than in other out-of-order mechanisms. In various embodiments, system 1800 may reconstruct an original program order for both out-of-order operations made by software and by hardware. In a further embodiment, the original program order may be reconstructed from an instruction stream that was first reordered by software in an out-of-order fashion, provided to hardware, and reordered again in an out-of-order fashion by the hardware. Any suitable out-of-order operations may have been used. For example, software may have reordered the memory operations in an original instruction stream by using a binary translation software layer that reorders guest x86 memory operations in a virtual machine operation. In another example, hardware may have reordered the memory operations through out-of-order memory operation scheduling.

System 1800 may fetch, dispatch, execute, and retire instructions out-of-order. System 1800 may be implemented in any suitable manner to perform memory disambiguation while executing instructions.

In one embodiment, such instructions may include those in original instruction stream 1802. In such an embodiment, system 1800 may include a software scheduler 1804 to reorder memory operations in original instruction stream 1802 to produce software-reordered instruction stream 1808. Software scheduler 1804 may reorder memory operations and attach alias packets to the memory operations. The alias packets may contain information about how rescheduled memory operations are to be evaluated. In another embodiment, system 1800 may receive instructions that have already been reordered by software, such as those in software-reordered instruction stream 1808. In such an embodiment, system 1800 might not include software scheduler 1804. Furthermore, system 1800 may utilize any suitable number or kind of out-of-order processors or processing entities. System 1800 may illustrate elements of such a processor 1814, which may include any processor core, logical processor, processor, or other processing entity such as those illustrated in FIGS. 1-17.

In one embodiment, processor 1814 may include a front end 1816 to fetch instructions to be executed and to prepare such instructions to be used later by other elements of processor 1814. In another embodiment, processor 1814 may include a hardware scheduler 1818 to reorder instructions in hardware and assign the instructions to be executed by various elements of processor 1814. Hardware scheduler 1818 may include an out-of-order hardware scheduler. Such instructions may be executed after being assigned to execution elements of processor 1814. In yet another embodiment, processor 1814 may include a memory execution unit (MEU) 1826 to perform memory disambiguation. Such disambiguation may include determining whether its received instructions include any memory operation conflicts. Such memory operation conflicts may include whether memory operations performed out-of-order are prone to error conditions or faults. As the instructions may have been executed but not retired, a determined error or fault may cause processor 1814 to roll-back execution to a previously known point, wherein the instructions responsible for the error or fault may be executed in-order. Otherwise, processor 1814 may retire the instructions if MEU 1826 determines that no fault or error has occurred. In still yet another embodiment, processor 1814 may include a rotating alias register (RAR) bank 1830 to track ordering of instructions as they are reordered by hardware and software. MEU 1826 may access RAR bank 1830 to perform memory disambiguation.

Furthermore, although specific elements of system 1800 may be described herein as performing a specific function, any suitable portion of system 1800 may perform the functionality described herein.

Software scheduler 1806 may be implemented in any suitable manner to accept original instruction stream 1802 and reorder memory operations thereof to produce software-reordered instruction stream 1808. In one embodiment, software scheduler 1804 may be implemented as a binary translator. In another embodiment, software scheduler 1804 may be implemented as a just-in-time compiler. The ability of software scheduler 1804 to reorder operations and instructions may be implemented by a reorder module 1806. Reorder module 1806 may be implemented by any suitable entity, such as a library, function, application programming interface, script, executable, application, program, instructions, or code. Reorder module 1806 may be called or otherwise accessed by software scheduler 1806. In various embodiments, reorder module 1806 may be communicatively coupled to but not included within software scheduler 1806. Software scheduler 1806 and reorder module 1806 may include instructions stored in machine-readable memory and may be executable by a processor. The instructions, when read by the processor, may perform the described functionality of software scheduler 1806 and reorder module 1806. Software scheduler 1806 and reorder module 1806 may operate on any suitable machine, such as a laptop, server, mobile device, computer, blade, or virtual machine. Such a machine may be the same or different than a machine including processor 1814.

Software scheduler may produce software-reordered instruction stream 1808. Software-reordered instruction stream 1808 may include any suitable number of memory operations 1810. Such memory operations 1810 may include an instruction for accessing memory of or communicatively coupled to processor 1814. Software scheduler may attach, to each such memory operation 1810, alias packets for identifying potential violations of memory dependencies. Such alias packets may include, for example, one or more offsets 1812. Offsets 1812 may define how memory operations 1810, as resident within software-reordered instruction stream 1808, may be evaluated to determine whether an error or fault has occurred. Determining such errors may include, for example, whether given memory access with a higher PO executed out-of-order and before another memory with a lower PO violates data dependency. Any suitable set of rules or logic for evaluating a given memory access may be used.

Figure 19:
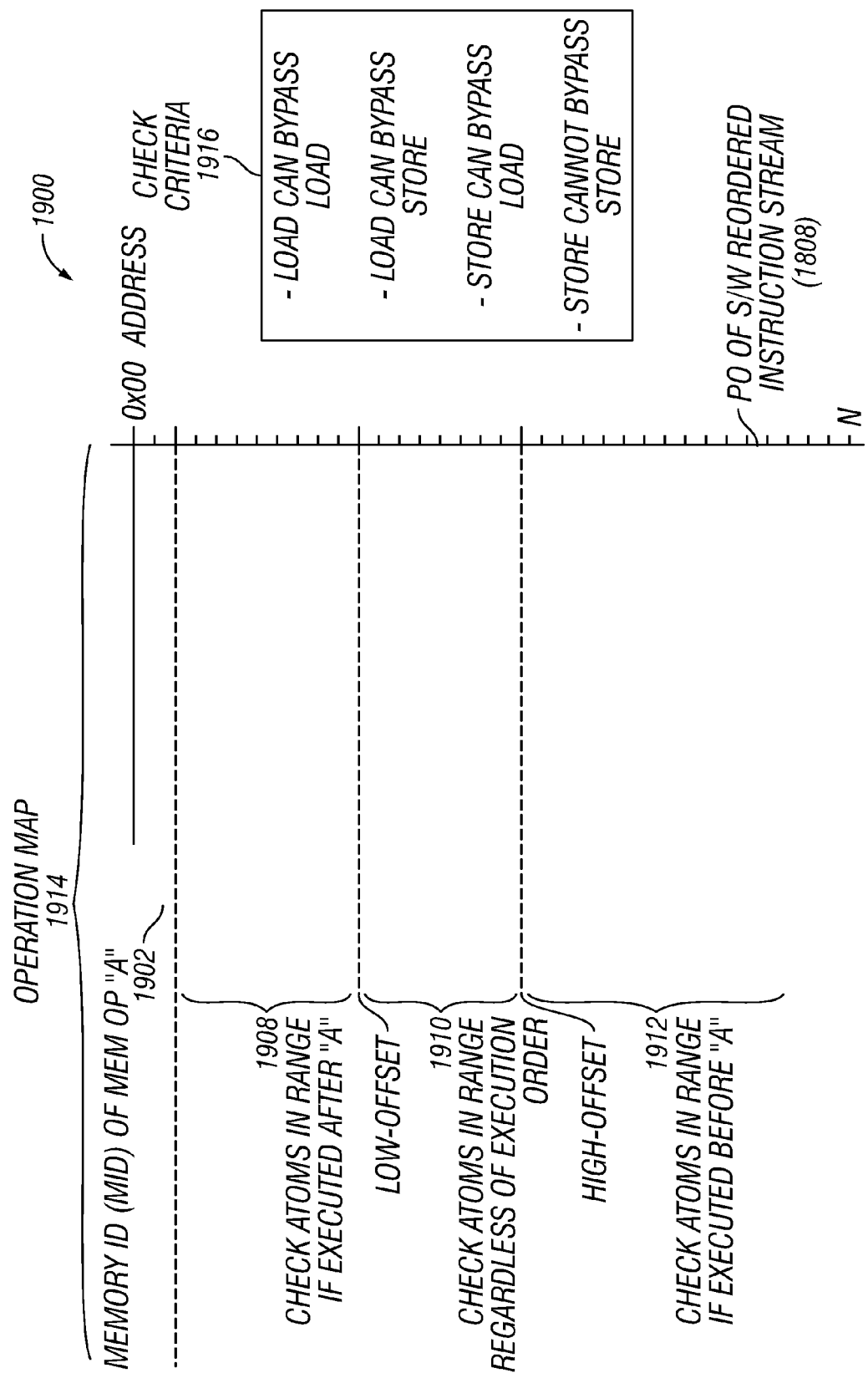
FIG. 19 is an illustration of example rules by which memory disambiguation may be performed on memory operations, in accordance with embodiments of the present disclosure.

FIG. 19 illustrates, among other elements, operation map 1914 illustrating the use of offsets to define what ranges of memory operations within software-reordered instruction stream 1808 are to be checked. The memory operations may be ordered according to the PO of software-ordered instruction stream 1808. The memory operations may be checked using any suitable set of criteria, such as those described in check criteria 1916. In one embodiment, given a starting address of a memory operation defined by, for example, a memory identifier (MID) 1902 of a memory operation "A", a low-offset may specify a range 1908 of addresses from MID 1902 to MID 1902 plus the low-offset. Within range 1908, memory operation atoms may be checked according to check criteria 1916—only if a given atom has been executed after "A". Thus, range 1908 may include operations originally ordered in original instruction stream 1802 with a lower PO than the operation indicated by MID 1902. As such operations may have been reordered, they may be checked for memory violations such as data dependency violation. The low-offset may thus provide memory disambiguation such that appropriate checks may be applied to the operations in range 1908.

In another embodiment, given an MID of "A", a high-offset may specify a range 1912 of addresses above MID plus the high-offset. Within range 1912, memory operation atoms may be checked according to check criteria 1916—but only if a given atom has been executed before "A". Thus, range 1912 may include operations originally ordered in original instruction stream 1802 with a lower PO than the operation indicated by MID 1902; furthermore, such operations are still are ordered higher than the operation indicated by MID 1902. As such operations may have been reordered, they may be checked for memory violations such as data dependency violation. The high-offset may thus provide memory disambiguation such that appropriate checks may be applied to the operations in range 1912.

In one embodiment, the high-offset and the low-offset may be equal. In such embodiments, the high-offset and the low-offset may illustrate the specific number of operations by which the operation "A" of MID 1902 has been reordered. In another embodiment, the high-offset and the low-offset may be unequal. In such an embodiment, a range 1910 of addresses between at MID 1902 plus the low-offset and MID 1902 plus the high-offset may be checked for memory violations regardless of execution order.

Returning to FIG. 18, front end 1816 may be implemented in any suitable manner to receive software-reordered instruction stream 1808 and fetch instructions for execution. For example, front end 1816 may be implemented fully or in part by front end 201, front end unit 430, or front end 570. Front end 1816 may pass software-reordered instruction stream 1808 to hardware scheduler 1818. In one embodiment, software-reordered instruction stream may be passed to hardware scheduler 1818 through passing of memory operations 1810 and alias operations associated with each such memory operation. Such alias operations may include, for example, offsets 1812.

Hardware scheduler 1818 may be implemented in any suitable manner. For example, hardware scheduler 1818 may be implemented in part by out-of-order execution engine 203, fast scheduler 202, slow/general floating point scheduler 204, simple floating point scheduler 206, execution engine unit 450, scheduler units 456, or resource schedulers 584. Hardware scheduler 1818 may reorder memory operations to better take advantage of available resources of processor 1814 and output the result as hardware- and software-reordered instruction stream 1832. Hardware scheduler 1818 may include a resource scheduler 1824 to assign various resources of processor 1814 to execute portions of hardware- and software-reordered instruction stream 1832. Thus, hardware scheduler 1818 may effect resource allocations. After execution, the operations of hardware- and software-reordered instruction stream 1832 may be checked for memory disambiguation by MEU 1826.

Furthermore, hardware scheduler 1818 may include a RAT module 1820 to rename references such that they are remapped to physical resources. A given logical reference in the instructions may be mapped to multiple, different physical resources, depending upon where the logical reference is located. RAT module 1820 may maintain a list of memory operations as they were originally fetched by front end 1816, thus reflecting software-reordered instruction stream 1808.

In addition, RAT module 1820 may include an MID calculation module 1822 to calculate MID values identifying memory operations in software-reordered instruction stream 1808. The MID values may be used to reconstruct original instruction stream 1802 from hardware-and-software reordered instruction stream 1832. MID values may be calculated such that memory operations may be identified in a circular bank such as RAR bank 1830. MID calculation module 1822 may add an MID to each memory operation received and propagated by hardware scheduler 1818.

Furthermore, MID calculation module 1822 may calculate a virtual age or an order for each memory operation in software-reordered instruction stream 1808. The virtual age or order may be used to infer the original position of the memory operation in original instruction stream 1802. The virtual age or order may be based upon alias information such as offsets 1812. The virtual age or order may be stored in RAR bank 1820. The virtual age or order may describe the position of the memory operation as it is ordered within hardware processor 1814 based upon the original position of the memory operation as it was ordered in software-reordered instruction stream 1808. MID calculation module 1822 may accept indications of memory operations and associated alias operations through software-reordered instruction stream 1808. Furthermore, MID calculation module 1822 may add additional indications of memory operations and associated alias operations such as the virtual age or order, as well as other aliasing information for the reordering of operations performed in hardware by hardware scheduler 1818. The indications of memory operations and alias operations may be passed to, for example, resource scheduler 1824 or RAR bank 1830.

MEU 1826 may accept indications of memory operations as they are executed. However, such memory operations might not yet have been retired. MEU 1826 may perform memory disambiguation on the operations to determine whether any memory errors, such as data dependency errors, have occurred. The data dependency errors may be the result of errors in scheduling execution of memory operations in an out-of-order fashion. If any such errors have occurred, MEU 1826 may cause a rollback to a previously known execution state predating the scheduling of operations causing such errors. The memory operations may then be reexecuted in linear, in-order fashion to avid the errors. If errors have occurred, MEU 1826 may generate a fault. If errors have not occurred, MEU 1826 may, for example, retire the memory operations or otherwise indicate that the memory operations are valid and are eligible for retirement. Such retirement may cause resource reclamation.

MEU 1826 may be implemented in any suitable manner. In one embodiment, to perform memory disambiguation MEU 1826 may include an alias hardware unit 1828. Alias hardware unit 1828 may accept indications of executed memory operations and associated aliases. Such alias information may be stored, for example, in RAR bank 1830. MEU 1826 may reorder memory operations such that the memory operations are arranged in the manner received by hardware scheduler 1818. Such ordering may conform to the ordering of software-reordered instruction stream 1808. The ordering may be made in any suitable manner. For example, MEU 1826 may interpret alias operations inserted by hardware scheduler 1818.

After MEU 1826 reorders memory operations to the order of software-reordered instruction stream 1808, alias hardware unit 1828 may perform memory disambiguation by checking for memory access violations. Alias hardware unit 1828 may evaluate information about the memory operations contained within RAR bank 1830 to evaluate each received memory operation. Alias hardware unit 1828 may apply any suitable logic, rules, or criteria to perform memory disambiguation. In one embodiment, alias hardware unit 1828 may include rules 1834 by which the contents or RAR bank 1830 will be evaluated for memory disambiguation.

RAR bank 1830 may be implemented in any suitable manner. In one embodiment, RAR bank 1830 may be included in MEU 1826. In another embodiment, RAR bank 1830 may be implemented separately from MEU 1826. In various embodiments, RAR bank 1830 may be implemented in content-addressable memory (CAM). By using CAM, given a data word, such as a MID, the CAM may be searched and any data within the CAM associated with the data word, such as one or more entries, may be returned.

RAR bank 1830 may include any suitable number and kind of entries. In one embodiment, MID may identify the position of an entry in RAR bank 1830. The number of memory atoms to be covered by RAR bank 1830 may be larger than the number of MID entries available in RAR bank 1830. Accordingly, in a further embodiment, RAR bank 1830 may be implemented as a rotating buffer, wherein the MID may be set to a hash of a current count of the number of memory atoms. For example, RAR bank 1830 may include sixty-four different MID values. Access to RAR bank 1830 by a given MID value may return multiple results. A MOD operation may be applied to the current count using the parameter of sixty-four, such that the current count is divided by sixty-four and the MID output of the function is the remainder, in whole numbers, of the division operation. A current count of sixty-five may thus result in an MID of one, as would a current count of one.

In another embodiment, RAR bank 1830 may include any suitable indication of the location of a memory operation. For example, RAR bank 1830 may include an identification of a page of memory on which the memory operation resides. In another example, RAR bank 1830 may include a starting address and an ending address for the byte granularity of the memory operation. The starting and ending addresses may point into a 4 k page boundary memory space.

In yet another embodiment, RAR bank 1830 may include a virtual age or order for each memory operation. In a further embodiment, RAR bank 1830 may include a virtual age including a range of MID addresses against which the memory operation will be checked. In another, further embodiment, RAR bank 1830 may include a virtual age for use within the checking operation itself.

In still yet another embodiment, RAR bank 1830 may include any other information useful for performing memory disambiguation. For example, RAR bank 1830 may include indications of whether a memory operation is valid or has been executed. In another example, RAR bank 1830 may include indications of whether a memory operation is a store operation or a load operation.

FIG. 19 is an illustration of example rules 1900 by which memory disambiguation may be performed on memory operations, in accordance with embodiments of the present disclosure. Rules 1900 may fully or partially implement rules 1834. In one embodiment, rules 1900 may include an operation map 1914, introduced above. Operation map 1914 may illustrate, for a given memory operation "A" identified by MID 1902, against what other atoms the memory operation will be evaluated. The evaluation may be performed by alias hardware unit 1828 using RAR bank 1830 to compare the operation against other atoms. Operation map 1914 may illustrate ascending PO order as presented in software-reordered instruction stream 1808.

Operation map 1914 may illustrate ranges 1908, 1910, and 1912 defined by low-offset and high-offset from MID 1902. Range 1908 may illustrate a range of addresses of atoms which will be checked if such atoms are executed after the memory operation "A" identified by MID 1902. Range 1910 may illustrate a range of addresses of atoms which will be checked regardless of whether such atoms are executed before the memory operation "A" identified by MID 1902. Furthermore, range 1912 may illustrate a range of addresses of atoms which will be checked if such atoms are executed before the memory operations "A" identified by MID 1902.

The evaluation of a given memory operation against elements of RAR bank 1830 may be made using any suitable criteria or logic. For example, rules 1900 may include check criteria 1916. Check criteria 1916 may specify whether or not a fault or error should be generated based upon the contents of a memory operation and another atom from RAR bank 1830. Such a fault or error may include, for example a violation of data dependency. Check criteria 1916 may be applied to the given memory operation and atoms identified by rangers 1908, 1910, 1912. For example, check criteria may be applied to "A" and atoms in range 1908 which are executed after "A"; to "A" and atoms in range 1910 regardless of execution order; and to "A" and atoms in range 1912 which are executed before "A".

Check criteria 1916 may include any suitable criteria or rules. The criteria or rules may take into account the ability of system 1800 to map logical resource use to different physical resources. In one embodiment, check criteria 1916 may specify whether a load operation may be executed out-of-order with another load operation. For example, a later load operation may be executed before, or bypass, an earlier load operation. In another embodiment, check criteria 1916 may specify whether a load operation may be executed out-of-order with a store operation. For example, a later load operation may be executed before, or bypass, an earlier store operation. In another example, a later store operation may be executed before, or bypass, an earlier load operation. In yet another embodiment, check criteria 1916 may specify whether that a store operation may be executed out-of-order with another store operation. For example, a later store operation might not be executed before, or bypass, an earlier store operation.

Figure 20:
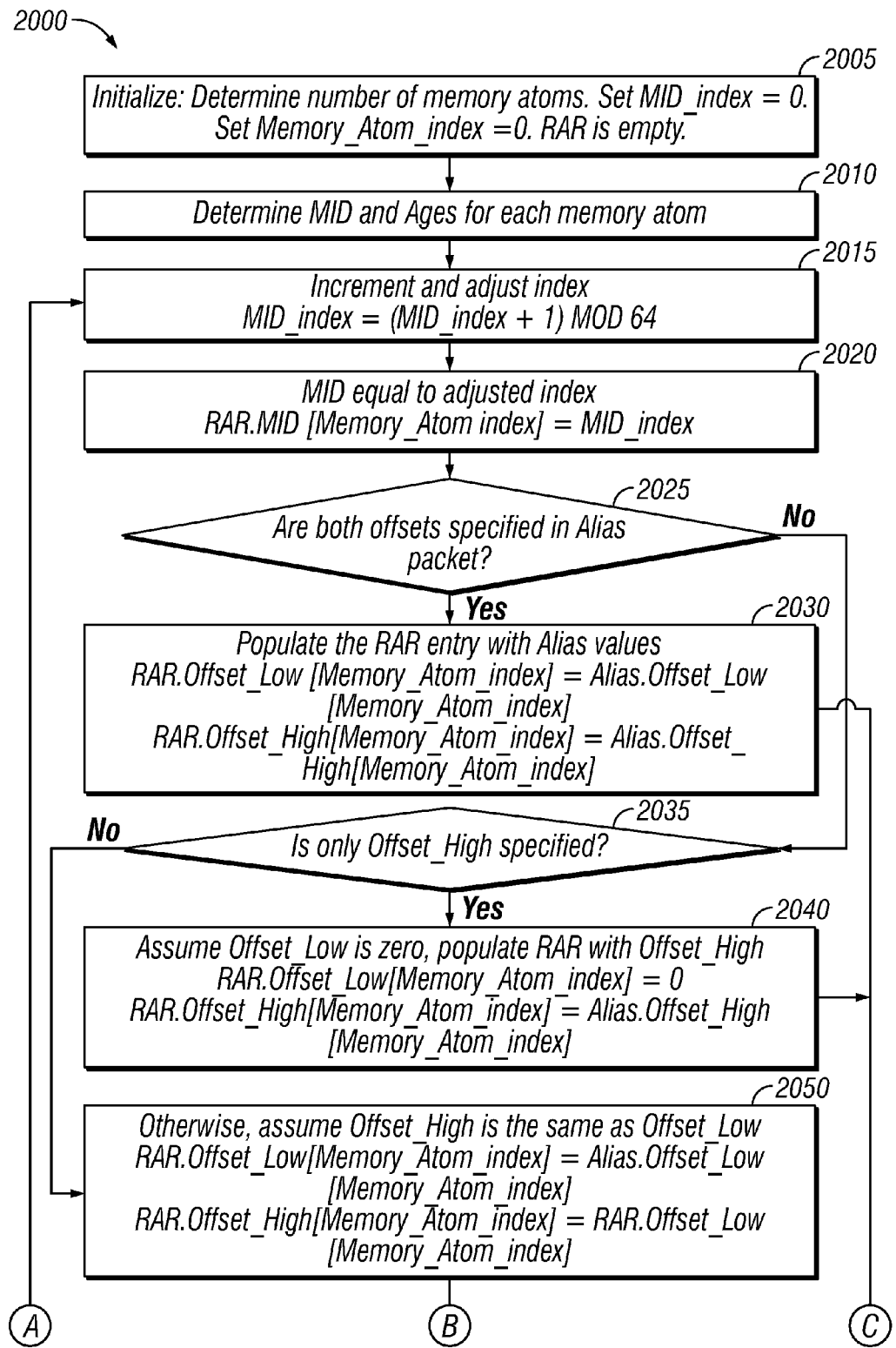
FIG. 20 is an illustration of a method for generating memory identifiers and virtual ages, in accordance with embodiments of the present disclosure.
Figure 20:
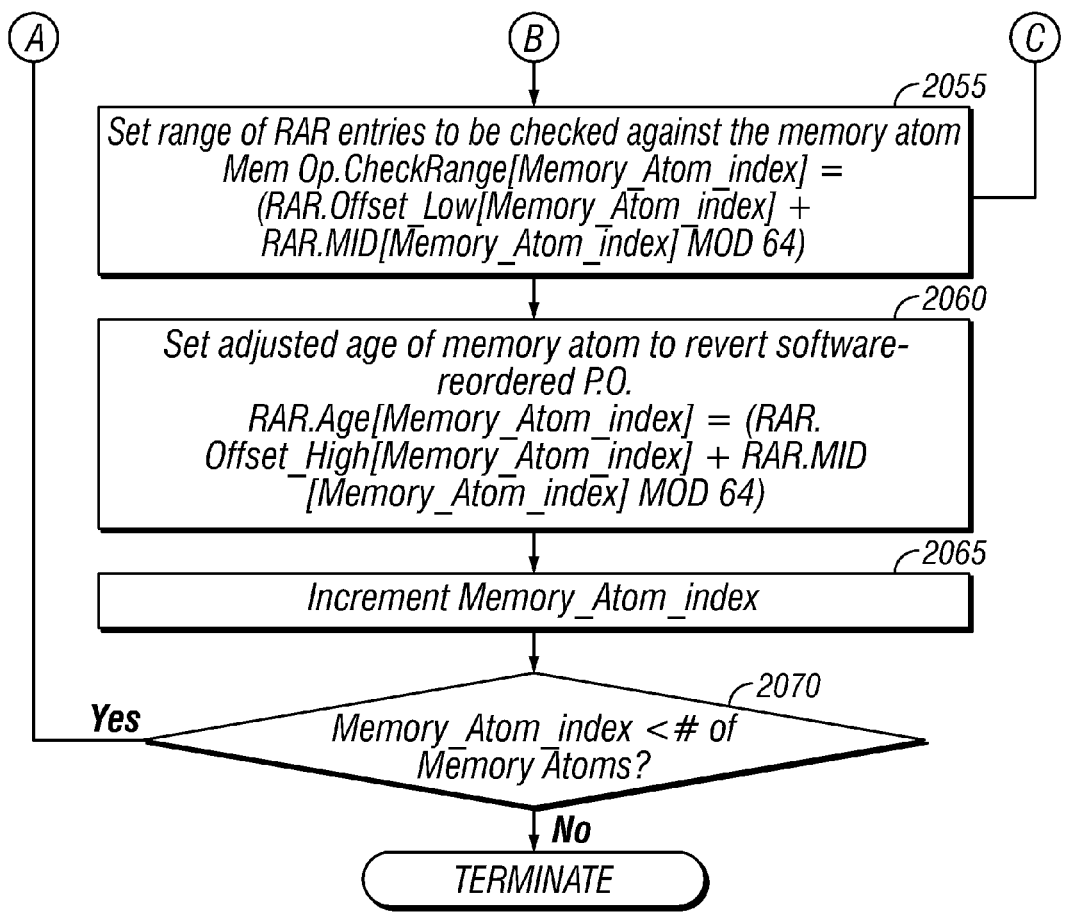

FIG. 20 is an illustration of a method 2000 for generating MIDs and virtual ages or orders for software-reordered instruction stream 1826, in accordance with embodiments of the present disclosure. Method 2000 may illustrate operations performed by, for example, MID calculation module 1822 to populate RAR bank 1830. MID calculation module 1822 may make such determinations based upon alias information received in association with memory operations, such as offsets 1812. Method 2000 may begin at any suitable point and may execute in any suitable order. In one embodiment, method 2000 may begin at 2005.

At 2005, MID calculation module 1822 may initialize any necessary operations. MID calculation module 1822 may determine a number of memory atoms representing memory operations in software-reordered instruction stream 1808. An index for tracking MID, such as MID_index, may be set to zero. Furthermore, an index for tracking the number of memory atoms processed, such as Memory_Atom_index, may be set to zero. RAR bank 1830 may be cleared or otherwise initialized.

At 2010, MID calculation module 1822 may determine the MID and ages for each memory atom in RAR bank 1830. Any suitable operations, such as those described herein, may be performed. The operations described below may be repeated for each memory atom captured in software-reordered instruction stream 1808.

At 2015, MID calculation module 1822 may increment the index of MID entries. For example, MID_index may be incremented. Furthermore, MID_index may be MOD'd by the number of MIDs in RAR bank 1830, such as sixty-four.

At 2020, the MID of the corresponding RAR bank 1830 entry may be set to the present MID_index value. This may be expressed by, for example, RAR.MID[Memory_Atom_index]=MID_index. RAR bank 1830 may be represented by the object "RAR", and the MID field of the memory atom may be assigned the present MID value.

At 2025, MID calculation module 1822 may begin to determine the effect of offsets 1812 upon the RAR bank 1830 entry. In one embodiment, it may be determined whether both a high and low offset were specified in the alias packet associated with the memory operation. If so, method 2000 may proceed to 2030 to adopt offset values for RAR bank 1830 calculations. If not, method 2000 may proceed to 2035 for additional determinations.

At 2030, MID calculation module 1822 may adopt the offset values of offsets 1812 if both offsets are specified in offsets 1812 of the alias messages. In one embodiment, the low offset of the memory operation entry in RAR bank 1830 may be set to the low offset of offsets 1812, and the high offset of the memory operation entry in RAR bank 1830 may be set to the high offset of offsets 1812. This may be expressed by, for example, RAR.Offset_Low[Memory_Atom_index]=Alias.Offset_Low[Memory_Atom_index]

and

RAR.Offset_High[Memory_Atom_index]=Alias.Offset_High[Memory_Atom_index].

Method 2000 may proceed to 2055.

At 2035, in another embodiment MID calculation module 1822 may determine whether only the high-offset is specified in offsets 1812 of the alias messages. If so, method 2000 may proceed to 2040 to adopt offset values for RAR bank 1830 calculations. If not, method 2000 may proceed to 2050 to adopted different offset values for RAR bank 1830 calculations.

At 2040, MID calculation module 1822 may assume the low offset is zero and adopt the high offset if only the high offset is specified in offsets 1812 of the alias messages. In one embodiment, the low offset of the memory operation entry in RAR bank 1830 may be set zero, and the high offset of the memory operation entry in RAR bank 1830 may be set to the high offset of offsets 1812. This may be expressed by, for example, RAR.Offset_Low[Memory_Atom_index]=0 and

RAR.Offset_High[Memory_Atom_index]=Alias.Offset_High[Memory_Atom_index].

Method 2000 may proceed to 2055.

At 2050, MID calculation module 1822 may assume the high offset is the same as the low offset, and adopt the high offset if only the low offset is specified in offsets 1812 of the alias messages. In one embodiment, the low offset of the memory operation entry in RAR bank 1830 may be set to the low offset of offsets 1812, and the high offset of the memory operation entry in RAR bank 1830 may also be set to the low offset of offsets 1812. This may be expressed by, for example, RAR.Offset_Low[Memory_Atom_index]=Alias.Offset_Low[Memory_Atom_index]

and

RAR.Offset_High[Memory_Atom_index]=RAR.Offset_Low[Memory_Atom_index].

Method 2000 may proceed to 2055.

At 2055, offsets from offset 1812 may have been populated into RAR bank 1830 as appropriate. In one embodiment, MID calculation module 1822 may determine ranges of memory atoms to be checked against the memory operation based on such offsets. In a further embodiment, MID calculation module 1822 may determine that the range of memories to be checked may include the atoms after the MID value and the adopted low offset. Furthermore, the value of the MID value plus the adopted low offset may be MOD'd to normalize the check range to the sixty-four MID entries of RAR bank 1830. This may be expressed by, for example, RAR.CheckRange[Memory_Atom_index]=
    (RAR.Offset_Low[Memory_Atom_index]+
    RAR.MID[Memory_Atom_index] MOD 64)

The "CheckRange" field may establish, for the given memory operation, the last memory atom of RAR bank 1830 that is to be checked against the memory operation.

At 2060, in another embodiment, MID calculation module 1822 may determine a virtual age or order for the memory operation. In a further embodiment, this virtual age may be adjusted based upon offsets adopted by MID calculation module 1822. Specifically, the virtual age may be the MID plus the offset setting after which memory atoms may be checked if executed before the memory operation. Such an offset setting may be the high offset. Furthermore, the value of the virtual age may be MOD'd to normalize the age to the sixth-four MID entries of RAR bank 1830. This may be expressed by, for example, RAR.Age[Memory_Atom_index]=(RAR.Offset_High
    [Memory_Atom_index]+RAR.MID[Memory_Atom_index] MOD 64)

The "Age" field may establish, for the given memory operation, the adjusted virtual age or order which may be used to evaluate memory operations against each other.

At 2065, MID calculation module 1822 may increment the index for tracking the number of memory atoms that have been processed. At 2070, MID calculation module 1822 may determine whether it has reached the end of the memory operations. If so, method 2000 may terminate. If not, method 2000 may repeat at 2015.

After execution of method 2000, calculation module 1822 may have populated RAR bank 1830. Subsequently, upon execution of the memory operations, alias hardware unit 1828 may perform memory disambiguation on each memory operation by applying rules 1824 to elements of RAR bank 1830.

Figure 21:
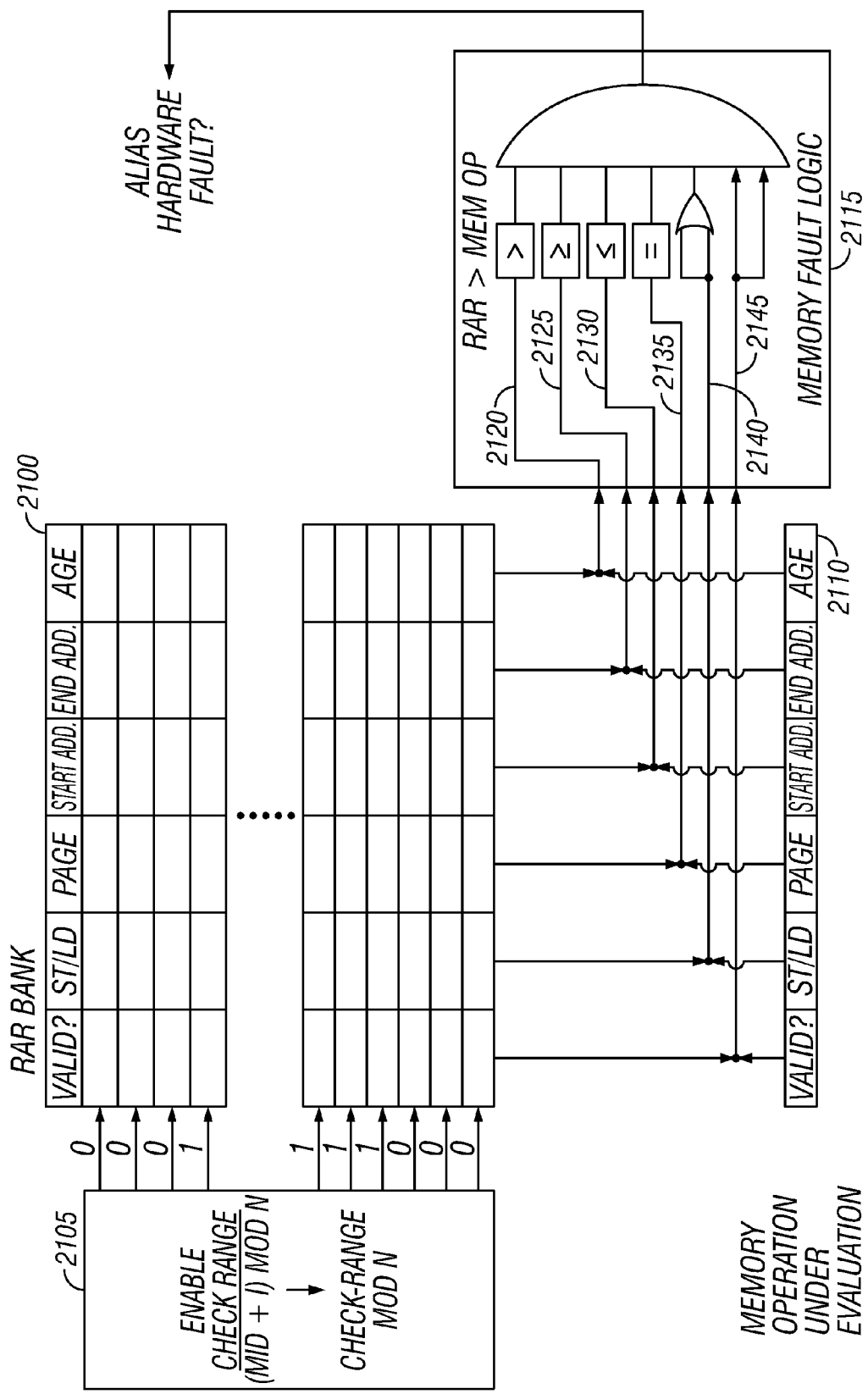
FIG. 21 is an illustration of operation of an alias hardware unit, in accordance with embodiments of the present disclosure.

FIG. 21 is an illustration of operation of alias hardware unit 1828 upon a RAR bank by applying rules 1834, in accordance with embodiments of the present disclosure. In one embodiment, RAR bank 2100 may implement RAR bank 1830. RAR bank 2100 may include entries for each memory operation. RAR bank 2100 may be implemented as CAM. In one embodiment, information for a given memory operation may be made by inputting its MID. RAR bank 2100 may include fields for validity, a store or load operation, a memory page number, a starting memory address, an ending memory address. In another embodiment, RAR bank 2100 may include a virtual age or order. The virtual age or order may be set by, for example, MID calculation module 1822 at 2060 of FIG. 20.

Alias hardware unit 1828 may thus utilize the high offset as included in the virtual age or order to perform static reordering of memory operations in the hardware. While the MIDs may be assigned in program order of software-reordered instruction stream 1808, adjustment using the virtual age or order may reorder MIDs to reflect the PO of original instruction stream 1802. The use of virtual age as an offset from MID may be thus used in comparisons to determine which atom is older in PO of original instruction stream 1802. Such comparisons may be used to evaluate reorderings performed by software scheduler 1804. With this approach, the alias hardware unit 1828 may perform memory disambiguation on both reorderings performed in software and in the hardware scheduler of the processor.

In yet another embodiment, RAR bank 2100 may include a field for information 2105 specifying a range of atoms in RAR bank 2100 which will be compared against a given memory operation. Field of information 2105 may be set by, for example, MID calculation module 1822 at 2055 of FIG. 20. Field of information 2105 may provide enablement to entries of RAR bank 2100 such that they may be compared to a given memory operation 2110. Field of information 2105 may include an upper limit defining the last atom which may be compared to the given memory operation.

Alias hardware unit 1828 may access the given memory operation 2110 under evaluation through the memory operation's MID in RAR bank 1830. In one embodiment, all operations in RAR bank 1830, which may include multiple entries, corresponding to the MID may be returned. Field values of each such entry may be compared, atom-by-atom, with corresponding field values of atoms within the range enabled by field of information 2105. In one embodiment, such a range may include the MID value plus one (MOD'd by sixty-four) through the check-range value stored in RAR bank 1830 memory operation 2110 (also MOD'd by sixty-four).

For each atom within the range specified by field of information 2105, alias hardware unit 1828 may determine whether any memory violations have occurred with respect to memory operation 2110. In one embodiment, alias hardware unit 1828 may compare a given atom's data from RAR bank 2100 with each piece of data from a memory operation 2110 returned by the MID lookup in RAR bank 2100. In a further embodiment, if more than one memory operation 2110 is returned by the MID lookup in RAR bank 2100, the atom may be compared against each such memory operation 2110. In another, further embodiment, each additional atom within the range enabled by field of information 2105 may be compared against each such memory operation 2110.

Alias hardware unit 1828 may utilize any suitable logic or rules to compare memory operation 2110 against atoms enabled in RAR bank 2100. Such logic or rules may include, for example, those included in rules 1834. In the example of FIG. 21, alias hardware unit 1828 may include memory fault logic 2115 for implementing logic to determine whether comparisons of atoms of RAR bank 2100 and memory operation 2110 indicate an overlap in memory operations that violate, for example, data dependency. Such an overlap causing a violation may cause an error or fault. Memory fault logic 2115 may be implemented in hardware such as logic gates.

Memory fault logic 2115 may check whether a plurality of conditions is present in the comparison of RAR bank 2100 atoms and memory operation 2110. In one embodiment, if any such condition fails, then a memory fault might not be generated. Conversely, if all such conditions are true, then a memory fault may be generated.

In one embodiment, memory fault logic 2115 may include a condition 2120 that a given atom's virtual age is older than the virtual age of memory operation 2110.

In another embodiment, memory fault logic 2115 may include a condition 2125 that a given atom's end address is greater or equal to the end address of memory operation 2110. In yet another embodiment, memory fault logic 2115 may include a condition 2130 that a given atom's start address is less or equal to the start address of memory operation 2110.

In still yet another embodiment, memory fault logic 2115 may include a condition 2135 that determines whether a given atom is on the same memory page as memory operation 2110. Such a condition may eliminate faults that otherwise may be attributed to an incorrect memory operation 2110. If a given atom and a given memory operation 2110 are not even on the same memory page, then memory operation 2110 may represent a memory operation with an MID equivalent to another such memory operation that actually be related to the memory atom. As noted above, looking up an MID in RAR bank 2100 implemented with CAM may retrieve multiple entries corresponding to the same MID.

In another embodiment, memory fault logic 2115 may include a condition 2140 that determines whether either the atom or memory operation 2110 includes a store operation. Such a condition may eliminate the possibility of a fault if both memory operation 2110 and the atom are load operations, as two load operations may be allowed even if out-of-order. In yet another embodiment, fault logic 2115 may include a condition 2140 that determines whether both the atom and memory operation 2110 are valid. If not, the determination of a fault may not yet be ready to be made.

Figure 22:
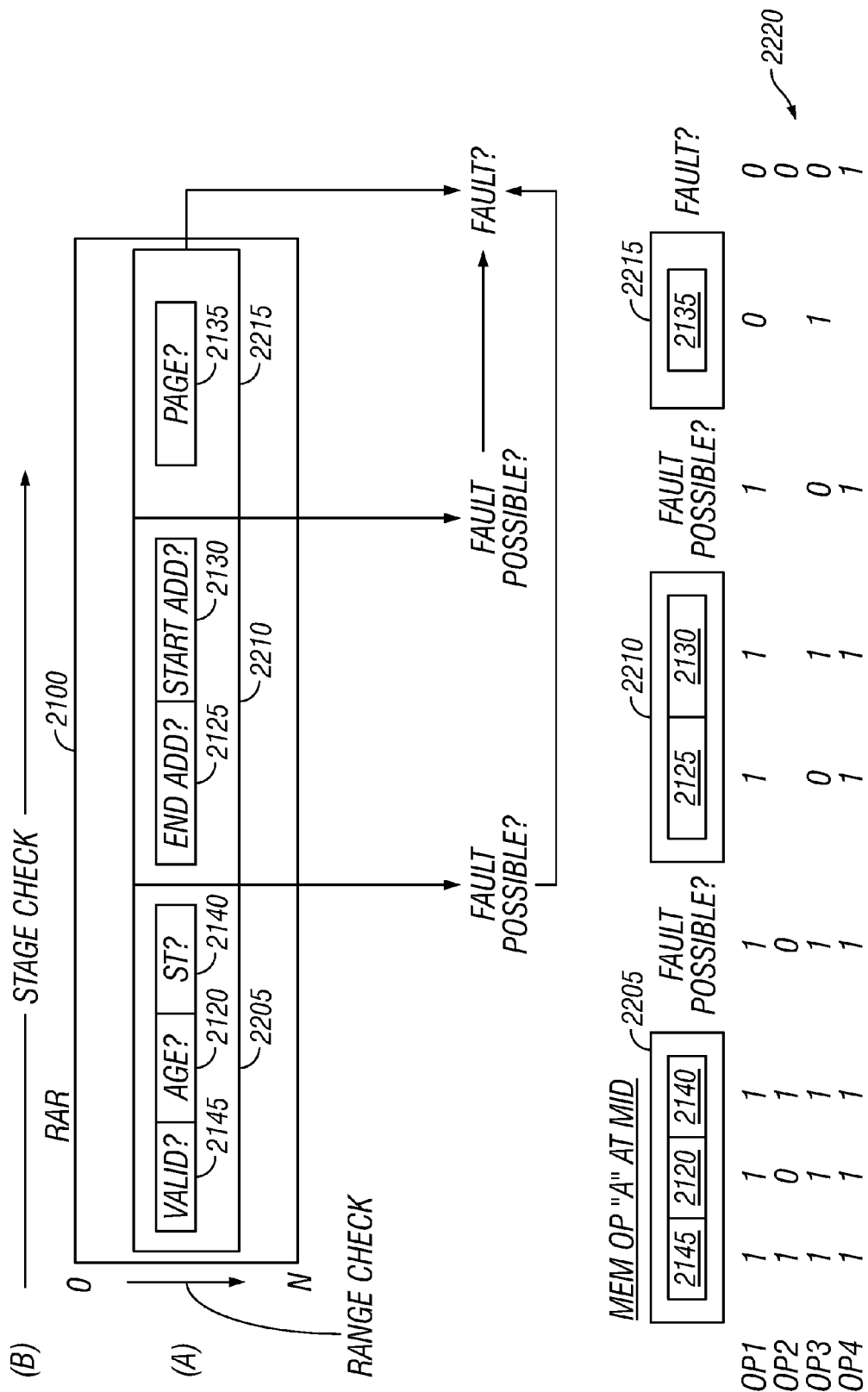
FIG. 22 illustrates further operation of an alias hardware unit, in accordance with embodiments of the present disclosure.

FIG. 22 illustrates further operation of alias hardware unit 1828 to perform memory disambiguation, in accordance with embodiments of the present disclosure. The checks on the conditions illustrated in memory fault logic 2115 may be performed in any suitable manner. In one embodiment, alias hardware unit 1828 may perform the checks on conditions in RAR bank 2100 using an instruction pipeline. The instruction pipeline may include a series of stages. One or more checks may be performed simultaneously in a discrete stage.

In a further embodiment, execution of additional stages may be predicated upon the outcome of previous stages.

In the example of FIG. 22, alias hardware unit 1828 may apply three stages, 2205, 2210, 2215 in succession. The conditions of 2205, 2210, 2215 may be selected such that all conditions therein must be met to determine that a memory error or fault has occurred. If application of stage 2205 fails to meets its criteria for a memory fault determination, stages 2210 and 2215 may be omitted. Such stages may be unnecessary to be executed if a memory fault determination is impossible due to the determination in stage 2205. If application of stage 2205 meets its criteria for a memory fault determination, stage 2210 may be applied. If application of stage 2210 fails to meets its criteria for a memory fault determination, stage 2215 may be omitted. If application of stage 2210 meets its criteria for a memory fault determination, stage 2215 may be applied. If stage 2215 meets its criteria for a memory fault determination, alias hardware unit 1828 may issue a memory fault. Execution of memory operations may be rolled back to a previously known, safe point. The memory operations may be reexecuted linearly according to PO to avoid the memory fault. Such a linear execution may be made according to the virtual age or order fields of RAR register bank 1830.

In one embodiment, stage 2205 may include checks for conditions 2120, 2140, 2145. Conditions 2120, 2140, 2145 may be performed together during application of stage 2205. If any of conditions 2120, 2140, 2145 fail, then according to memory fault logic 2115 a memory fault is not possible. Accordingly, stage 2205 may terminate execution of the pipeline. If all of conditions 2120, 2140, 2145 are met, then according to memory fault logic 2115 a memory fault is still possible. Execution may then be passed to stage 2210.

In another embodiment, stage 2210 may include checks for conditions 2125, 2130. Conditions 2125, 2130 may be performed together during application of stage 2210. If any of conditions 2125, 2130 fail, then according to memory fault logic 2115 a memory fault is not possible. Accordingly, stage 2210 may terminate execution of the pipeline. If all of conditions 2125, 2130 are met, then according to memory fault logic 2115 a memory fault may still be possible. Execution may then be passed to stage 2215.

In yet another embodiment, stage 2215 may include checks for conditions 2135. Condition 2135 may be performed together during application of stage 2215. If condition 2135 fails, then according to memory fault logic 2115 a memory fault is not possible. Alias hardware unit 1828 may issue an indication that no memory error or fault has been issued. If condition 2135 is met, then according to memory fault logic 2115 a memory fault should be issued by alias hardware unit 1828.

Any suitable order of execution of stages 2205, 2210, 2215 and their respective conditions may be performed by alias hardware unit 1828. As described above, in one embodiment, stages 2205, 2210, 2215 may be executed in sequential order. In another embodiment, conditions may be checked within a given stage for multiple entries in RAR bank 2100. Furthermore, checking of conditions within a given stage for multiple entries in RAR bank 2100 may be made before moving to the next stage.

In various embodiments, at (A) alias hardware unit 1828 may, for a given memory operation, apply all conditions of stage 2205 to each memory atom entry within RAR bank 2100 within the enabled check range for the given memory operation. The results may include, for each memory atom entry within the enabled check range, an indication of whether the memory atom entry meets the conditions of stage 2205 for a memory error or fault. For each memory atom failing the conditions for a memory error or fault, checking may be stopped with respect to the given memory operation.

In various other embodiments, at (B) alias hardware unit 1828 may perform analysis defined in stages subsequent to stage 2205 for the given memory operation. Such analysis might be performed only for each memory atom meeting the conditions of the previous stage for a memory error or fault. Analysis performed for subsequent stages may be performed in a manner similar to that described above for stage 2205. For example, alias hardware unit 1828 may, for the given memory operation, apply all conditions of stage 2210 to each memory atom entry within RAR bank 2100 that passed stage 2205. The results may include, for each memory atom entry that passed stage 2205, an indication of whether the memory atom entry meets the conditions of stage 2210 for a memory error or fault. For each memory atom failing the conditions for a memory error or fault, checking may be stopped with respect to the given memory operation. Alias hardware unit 1828 may, for the given memory operation, apply all conditions of stage 2215 to each memory atom entry within RAR bank 2100 that passed stage 2210. The results may include, for each memory atom entry that passed stage 2210, an indication of whether the memory atom entry meets the conditions of stage 2215 for a memory error or fault. Alias hardware unit 1828 may provide an indication of whether all the conditions of the pipeline were met, yielding a memory error or fault.

Table 2220 illustrates example operation of pipeline execution of alias hardware unit 1828. The pipeline execution may be made for an example memory operation "A" yielded by a given MID using CAM search in RAR bank 2100. If multiple memory operations are yielded from the MID, the pipeline execution may be repeated for each such memory operation. Four example memory operation atoms of RAR bank 2100 are illustrated as Op1, Op2, Op3, and Op4. Such memory operation atoms may be included with the range enabled by the memory operation's entry within RAR bank 2100.

First, alias hardware unit 1828 may compare memory operation "A" with Op1, Op2, Op3, and Op4 using criteria 2145, 2120, 2140 of stage 2205. The results may illustrate that Op1 passes all such criteria; Op2 passes two criteria but fails one criterion; Op3 passes all such criteria; and Op4 passes all such criteria. Accordingly, Op2 might be unable to generate a memory fault or error. Op1, Op3, and Op4 may still be capable of generating a memory fault or error.

Next, alias hardware unit 1828 may compare memory operation "A" with Op1, Op3, and Op4 using criteria 2125, 2130 of stage 2210. Comparison of Op2 may be unnecessary. The results may illustrate that Op1 passes all such criteria; Op3 passes a criteria but fails one criterion; and Op4 passes all such criteria. Accordingly, Op3 may be unable to generate a memory fault or error. Op1 and Op4 may still be capable of generating a memory fault or error.

Finally, alias hardware unit 1828 may compare memory operation "A" with Op1 and Op4 using criteria 2135 of stage 2215. Comparison of Op2 and Op3 may be unnecessary. The results may illustrate that Op1 fails the criteria and that Op4 passes the criteria. Accordingly, Op1 might not generate a memory fault or error, while Op4 may generate a memory fault or error.

Figure 23:
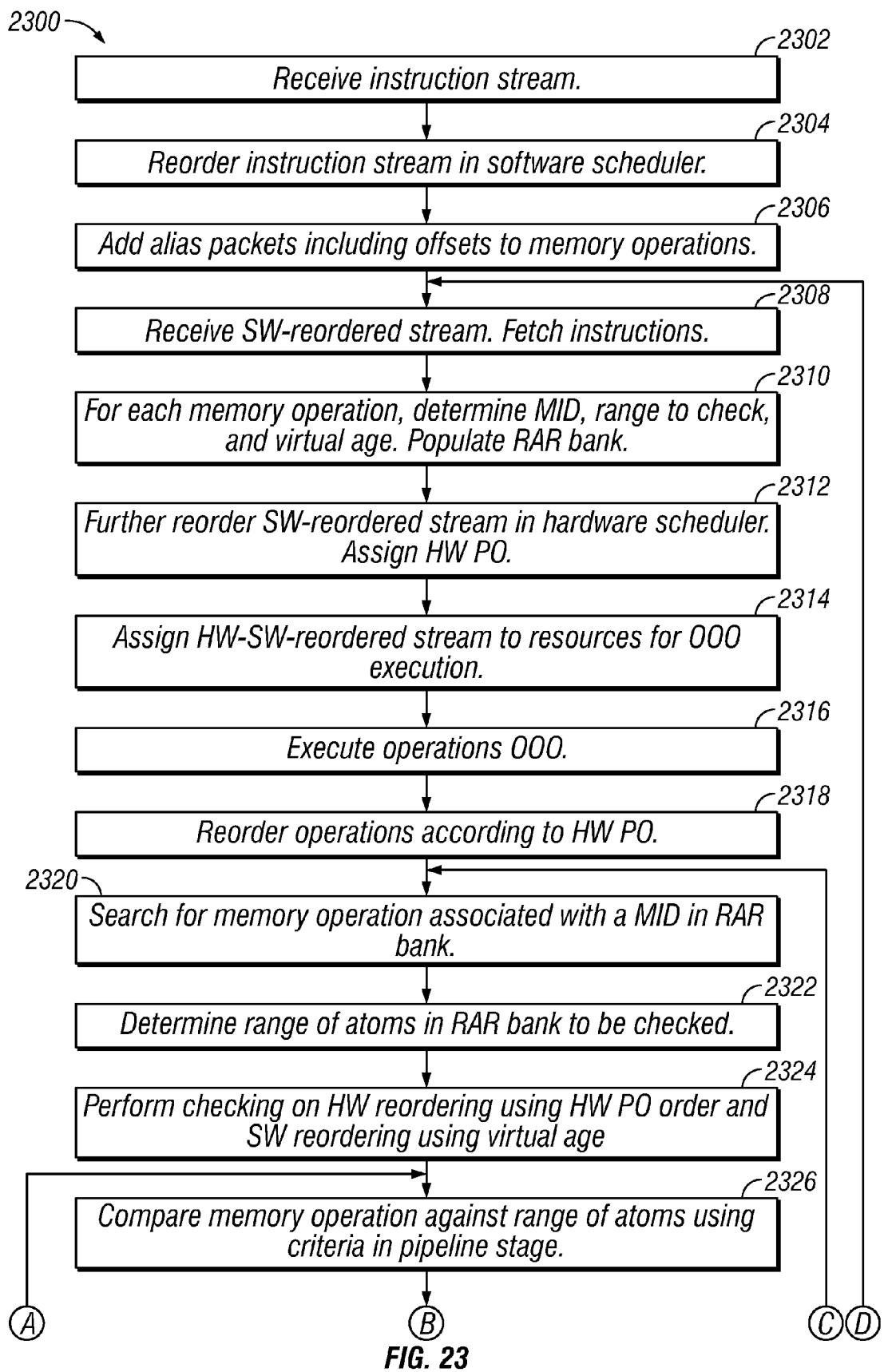
FIG. 23 is an illustration of a method for memory disambiguation, in accordance with embodiments of the present disclosure.
Figure 23:
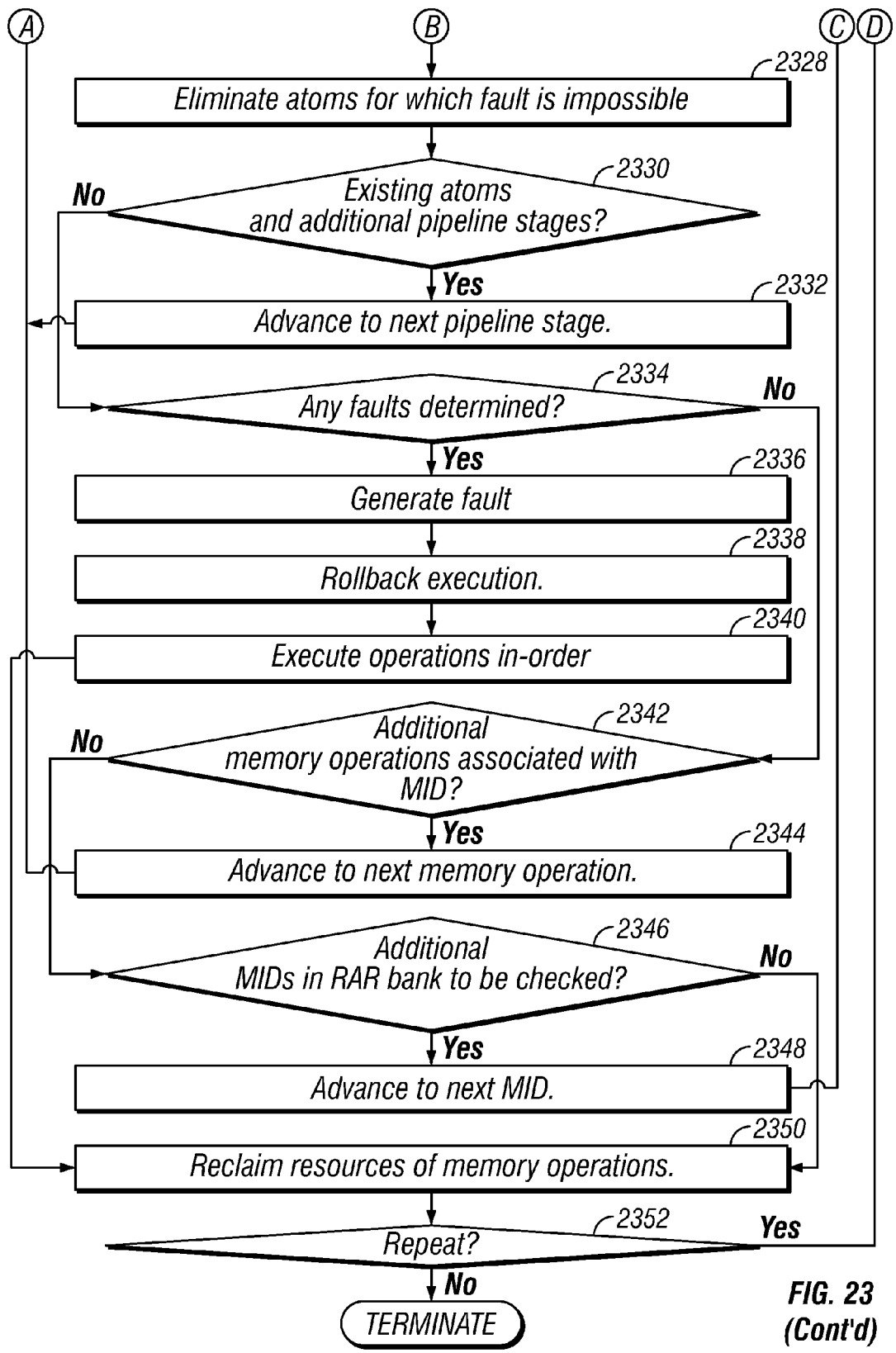

FIG. 23 is an illustration of a method 2300 for memory disambiguation, in accordance with embodiments of the present disclosure. Method 2300 may begin at any suitable point and may execute in any suitable order. In one embodiment, method 2300 may begin at 2302. In another embodiment, method 2300 may begin at 2308, wherein 2302, 2304, 2306 may be performed by another entity and such performance may be presumed by the performance of 2308. In various embodiments, some portions of method 2300 may be performed during the execution of an out-of-order processor.

In one embodiment, at 2302 an instruction stream to be executed may be received. At 2304, the instruction stream may be reordered by a software scheduler. Such a scheduler may be included in, for example, a just-in-time compiler or a binary translator. Software scheduling may be performed by executing code for a software scheduler as stored on machine-readable media. The code may be loaded on a processor and executed, resulting in the software scheduling of the instruction stream. The instructions that are reordered may include memory operations. At 2306, the software scheduler may add alias packets of information to the stream of instructions, such as offsets defining ranges of operations and how such ranges are to be evaluated for memory errors or faults. Each packet may be associated with a memory operation.

At 2308, the stream of instructions as reordered by the software scheduler may be received at a processor. Instructions may be fetched for execution by a front end of the processor.

At 2310, for each memory operation fetched from the stream of instructions, various determinations may be made. In one embodiment, a MID may be calculated for each memory operation. In another embodiment, a virtual age or order for the memory operation may be calculated. In yet another embodiment, a range of memory atoms to be checked for memory faults or errors may be determined. Such determinations may be made by a MID calculation module in hardware. Furthermore, the determinations may be made based upon offsets included in alias packets associated with a given memory operation. The determinations may be stored in any suitable location, such as a RAR bank implemented in CAM. The determinations may be implemented by, for example, fully or in part by method 2000.

At 2312, a hardware scheduler may further reorder the instructions. The reordering may be made to take advantage of out-of-order processing capabilities of the processor. A hardware PO may be assigned to the instructions.

At 2314, a resource scheduler in the processor may assign the instructions to various executing elements of the processor for execution. In one embodiment, at 2316 such execution may be performed out-of-order with respect to the hardware PO and with respect to the original order of the instructions as received at the software scheduler.

At 2318, after execution, memory operations may be reordered according to hardware PO. Reordering may be performed by an alias hardware unit. The reordering may restore the order of the memory operations as they appeared in the stream of instructions received from the software scheduler. In one embodiment, the memory operations may have executed but not yet been retired.

At 2320, the alias hardware unit may perform a CAM search for memory operations in the list of memory operations as it is stored in the RAR bank. The memory operation search may be made by searching for an associated MID. In one embodiment, more than one memory operation may be returned.

In one embodiment, at 2322 the alias hardware unit may determine a range of memory operation atoms of RAR bank that will each be checked against the memory operation. Such a determination may be made by accessing a range field in the RAR bank. The range field may have been set according to offsets of the memory operation and may reflect the original order of instructions.

At 2324, the alias hardware unit may compare the memory instruction against the atoms within the range may be performed. In one embodiment, the alias hardware unit may evaluate the memory instruction against the atoms while considering the instructions as ordered and scheduled by the hardware. Thus, the alias hardware unit may evaluate whether the reordering performed by hardware has caused any memory errors or faults. In another embodiment, the alias hardware unit may evaluate the instruction against the atoms while considering the instructions as ordered and scheduled by software. Thus, the alias hardware unit may evaluate whether the reordering performed by software has caused any memory errors or faults. In various embodiments, the alias hardware unit may evaluate the hardware reordering and the software reordering using a set of memory fault logic and rules.

For example, at 2326 the alias hardware unit may compare the memory operation against the range of atoms using a pipeline stage of execution. The pipeline stage may include criteria defined by a portion of the set of memory fault logic and rules. The comparison may be made nearly simultaneously between the memory operation and each of the range of atoms.

In one embodiment, at 2328 any atoms for which there is no possibility of a memory error or fault may be removed from consideration. Such a lack of memory error or fault may include, for example, comparisons between the memory operation and an atom which illustrate that one or more criteria for a memory error or fault have failed.

At 2330, the alias hardware unit may determine whether there are any other atoms still pending within the sequence of pipeline stages, and whether any more additional pipeline stages are to be executed. If there are pending atoms and there are additional pipeline stages, method 2300 may proceed to 2332. If there are no more pending atoms or if there are no more additional pipeline stages, method 2300 may proceed to 2334.

At 2332, the alias hardware unit may consider the next pipeline stage of execution. Method 2300 may proceed to 2326.

At 2334, the alias hardware unit may evaluate whether any faults have been determined so far. If not, method 2300 may proceed to 2342. If so, method 2300 may proceed to 2336.

At 2336, a memory fault associated with the memory operation may be generated and sent to other portions of the processor. Execution of the instructions may be halted. At 2338, execution may be rolled back to a previously known state, before allocation and execution of the memory operation that caused the fault. At 2340, the memory operation and surrounding instructions may be executed in-order. In one embodiment, such an order may include the order of instructions as originally received by the software scheduler. Such an order may be reconstructed by, for example, reference to the virtual age or order of memory operations as stored in the RAR bank. Method 2300 may proceed to 2350.

At 2342, the alias hardware unit may determine whether there are additional, unprocessed memory operations associated with the MID used to access the RAR bank. If so, method 2300 may proceed to 2344. If not, method 2300 may proceed to 2346.

At 2344, the alias hardware unit may advance to the next, unprocessed memory operation. Method 2300 may proceed to 2326.

At 2346, the alias hardware unit may determine whether there are additional, unprocessed MIDs in the RAR bank representing memory operations that are to be evaluated. If so, method 2300 may proceed to 2348. If not, method 2300 may proceed to 2350.

At 2350, the processor may reclaim resources used in the memory operations, if not already performed after determining that a given memory operation did not include memory faults or errors. At 2352, the processor may determine whether or not additional instructions to be fetched have arrived and require evaluation. If not, method 2300 may terminate. If so, method 2300 may proceed to 2308.

Methods 2000, 2300 may be initiated by any suitable criteria. Furthermore, although methods 2000, 2300 describe an operation of particular elements, methods 2000, 2300 may be performed by any suitable combination or type of elements. For example, method 2000 may be performed by MID calculation module 1822 or any other element operable to implement method 2000. In another example, method 2300 may be implemented by the elements illustrated in FIGS. 1-22 or any other system operable to implement method 2300. As such, the preferred initialization point for methods 2000, 2300 and the order of the elements comprising methods 2000, 2300 may depend on the implementation chosen. In some embodiments, some elements may be optionally omitted, reorganized, repeated, or combined.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor, comprising:
 a front end including circuitry to receive an instruction stream of memory operations as reordered by a software scheduler, each of the plurality of memory operations associated with a set of alias information;
 a hardware scheduler including circuitry to reorder, in hardware, the instruction stream for out-of-order execution by resources of the processor;
 a calculation module including circuitry to determine, for a given memory operation and based upon the set of alias information, a check range of memory atoms subsequent to the given memory operation in the instruction stream and a virtual order of the memory operation, the virtual order to indicate an original order of instructions; and
 an alias unit including circuitry to:
  after execution and before retirement of instructions of the instruction stream, reorder the instruction stream based on an order as received by the front end;
  determine whether the reorder of the instruction stream in hardware and subsequent execution caused a data dependency error; and
  determine, based upon the check range and the virtual order, whether the reorder of the instruction stream by the software scheduler and subsequent execution caused a data dependency error for the given memory operation when compared to the memory atoms.

2. The processor of claim 1, wherein:
the alias information includes a high offset; and
the alias unit further includes circuitry to evaluate memory atoms ordered past the given memory operation plus the high offset, wherein the memory atoms would have executed before the given memory operation.

3. The processor of claim 2, wherein the virtual order to indicate an original order of the instructions before reorder by the software scheduler is based upon a memory identification of the given memory operation and the high offset.

4. The processor of claim 1, wherein:
the alias information includes a low offset; and
the alias unit further includes circuitry to evaluate memory atoms ordered between the given memory operation and the given memory operation plus the low offset, wherein the memory atoms would have executed after the given memory operation.

5. The processor of claim 1, wherein the alias unit further includes circuitry to:
evaluate the given memory operation against the range of memory atoms with respect to a first set of criteria;
disregard elements of the range of memory atoms that indicate that comparison of a given memory atom with the given memory operation cannot produce a data dependency error; and
selectively evaluate the given memory operation against other elements of the range of memory atoms with respect to a second set of criteria.

6. The processor of claim 1, wherein:
the alias information includes a high offset and a low offset; and
the alias unit further includes circuitry to:
evaluate memory atoms ordered past the given memory operation plus the high offset, wherein the memory atoms would have executed before the given memory operation;
evaluate memory atoms that ordered between the given memory operation and the given memory operation plus the low offset, wherein the memory atoms would have executed after the given memory operation; and
evaluate memory atoms ordered between the low offset and the high offset regardless of execution order.

7. The processor of claim 1, wherein the alias unit further includes circuitry to, based on a determination of a data dependency error for the given memory operation, rollback execution of the instructions and repeat execution of the given memory operation in an in-order manner.

8. A method comprising, within a processor:
receiving an instruction stream, the instruction stream previously reordered by a software scheduler and including a plurality of memory operations, each of the plurality of memory operations associated with a set of alias information, the alias information indicating how a given memory operation may be evaluated;
reordering, in hardware, the instruction stream for out-of-order execution by resources of the processor;
executing the instruction stream out-of-order;
determining, for the given memory operation and based upon the set of alias information, a checking range of memory atoms subsequent to the given memory operation in the instruction stream and a virtual order of the memory operation, the virtual order indicating an original ordering of instructions before reordering by the software scheduler;
reordering, after execution and before retirement of instructions of the instruction stream, the instruction stream according to an order as received;
determining whether the reordering of the instruction stream in hardware and subsequent execution caused a data dependency error; and
determine, based upon the checking range and the virtual order, whether the reordering of the instruction stream by the software scheduler and subsequent execution caused a data dependency error for the given memory operation when compared to the memory atoms.

9. The method of claim 8, wherein:
the alias information includes a high offset; and
further comprising evaluating memory atoms that are ordered past the given memory operation plus the high offset, wherein the memory atoms have executed before the given memory operation.

10. The method of claim 9, wherein the virtual order indicating an original ordering of the instructions before reordering by the software scheduler is based upon a memory identification of the given memory operation and the high offset.

11. The method of claim 8, wherein:
the alias information includes a low offset; and
further comprising evaluating memory atoms that are ordered between the given memory operation and the given memory operation plus the low offset, wherein the memory atoms have executed after the given memory operation.

12. The method of claim 8, further comprising:
evaluating the given memory operation against the range of memory atoms with respect to a first set of criteria;
disregarding elements of the range of memory atoms that indicate that comparison of a given memory atom with the given memory operation cannot produce a data dependency error; and
selectively evaluating the given memory operation against remaining elements of the range of memory atoms with respect to a second set of criteria.

13. The method of claim 8, wherein:
the alias information includes a high offset and a low offset; and
further comprising:
evaluating memory atoms that are ordered past the given memory operation plus the high offset, wherein the memory atoms have executed before the given memory operation;
evaluating memory atoms that are ordered between the given memory operation and the given memory operation plus the low offset, wherein the memory atoms have executed after the given memory operation; and
evaluating memory atoms that are ordered between the low offset and the high offset regardless of execution order.

14. A system comprising:
an interface including circuitry to receive an instruction stream as reordered by a software scheduler, each of a plurality of memory operations associated with a set of alias information; and
a processor communicatively coupled to the interface and to execute the instruction stream, including:

a hardware scheduler including circuitry to reorder, in hardware, the instruction stream for out-of-order execution by resources of the processor;

a calculation module including circuitry to determine, for a given memory operation and based upon the set of alias information, a check range of memory atoms subsequent to the given memory operation in the instruction stream and a virtual order of the memory operation, the virtual order to indicate an original order of instructions; and an alias unit including circuitry to:
after execution and before retirement of the instructions of the instruction stream, reorder the instruction stream based on an order as received by the front end;
determine whether the reorder of the instruction stream in hardware and subsequent execution caused a data dependency error; and
determine, based upon the check range and the virtual order, whether the reorder of the instruction stream by the software scheduler and subsequent execution caused a data dependency error for the given memory operation when compared to the memory atoms.

15. The system of claim 14, wherein:
the alias information includes a high offset; and
the alias unit further includes circuitry to evaluate memory atoms are ordered past the given memory operation plus the high offset, wherein the memory atoms would have executed before the given memory operation.

16. The system of claim 15, wherein the virtual order to indicate an original ordering of the instructions before reorder by the software scheduler is based upon a memory identification of the given memory operation and the high offset.

17. The system of claim 14, wherein:
the alias information includes a low offset; and
the alias unit further includes circuitry to evaluate memory atoms ordered between the given memory operation and the given memory operation plus the low offset, wherein the memory atoms would have executed after the given memory operation.

18. The system of claim 14, wherein the alias unit further includes circuitry to:
evaluate the given memory operation against the range of memory atoms with respect to a first set of criteria;
disregard elements of the range of memory atoms that indicate that comparison of a given memory atom with the given memory operation cannot produce a data dependency error; and
selectively evaluate the given memory operation against other elements of the range of memory atoms with respect to a second set of criteria.

19. The system of claim 14, wherein:
the alias information includes a high offset and a low offset;
the alias unit further includes circuitry to:
evaluate memory atoms that ordered past the given memory operation plus the high offset, wherein the memory atoms would have executed before the given memory operation;
evaluate memory atoms that ordered between the given memory operation and the given memory operation plus the low offset, wherein the memory atoms would have executed after the given memory operation; and
evaluate memory atoms that ordered between the low offset and the high offset regardless of execution order.

20. The system of claim 14, wherein the alias unit further includes circuitry to, based on a determination of a data dependency error for the given memory operation, rollback execution of the instructions and repeat execution of the given memory operation in an in-order manner.

* * * * *

UNITED STATES PATENT AND TRADEMARK OFFICE
CERTIFICATE OF CORRECTION

PATENT NO. : 9,524,170 B2  
APPLICATION NO. : 14/139171  
DATED : December 20, 2016  
INVENTOR(S) : Rainer Theuer et al.

Page 1 of 1

It is certified that error appears in the above-identified patent and that said Letters Patent is hereby corrected as shown below:

On the Title Page

At item (71) Applicants:  
Rainer Theur, Sehnde (DE)

Should read:  
-- Rainer Theuer, Sehnde (DE) -- and

At item (72) Inventors:  
Rainer Theur, Sehnde (DE)

Should read:  
-- Rainer Theuer, Sehnde (DE) --

Signed and Sealed this  
Twenty-seventh Day of June, 2017

Joseph Matal  
*Performing the Functions and Duties of the*  
*Under Secretary of Commerce for Intellectual Property and*  
*Director of the United States Patent and Trademark Office*